US009832592B2

(12) United States Patent
Matsuoka

(10) Patent No.: US 9,832,592 B2
(45) Date of Patent: Nov. 28, 2017

(54) RADIO COMMUNICATION DEVICE AND RADIO COMMUNICATION METHOD

(71) Applicant: FUJITSU LIMITED, Kawasaki-shi, Kanagawa (JP)

(72) Inventor: Hideki Matsuoka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/546,482

(22) Filed: Nov. 18, 2014

(65) Prior Publication Data

US 2015/0140987 A1    May 21, 2015

(30) Foreign Application Priority Data

Nov. 21, 2013    (JP) .................................. 2013-240876

(51) Int. Cl.
*H04W 4/00*    (2009.01)
*H04W 88/06*    (2009.01)

(52) U.S. Cl.
CPC ............ *H04W 4/001* (2013.01); *H04W 88/06* (2013.01)

(58) Field of Classification Search
CPC ......... H04W 4/001; H04W 88/06; H04Q 7/20
USPC .......... 455/418, 552.1, 436–144, 420, 422.1, 455/425, 426.1, 435.2, 525, 93, 424, 464; 370/331–333, 381, 382, 383
See application file for complete search history.

(56) References Cited

U.S. PATENT DOCUMENTS

| | | | | |
|---|---|---|---|---|
| 6,963,745 | B2* | 11/2005 | Singh ................ | H04W 36/0066 455/436 |
| 8,325,679 | B2* | 12/2012 | Taaghol ................ | H04W 48/18 370/254 |
| 2002/0137514 | A1* | 9/2002 | Mitsugi ................ | H04B 1/0003 455/436 |
| 2004/0148600 | A1 | 7/2004 | Hoshino | |
| 2009/0190637 | A1* | 7/2009 | Lee ......................... | H04L 67/16 375/222 |
| 2011/0007713 | A1* | 1/2011 | Kobayashi ............ | H04W 28/06 370/332 |

(Continued)

FOREIGN PATENT DOCUMENTS

| | | |
|---|---|---|
| JP | 60-042791 A | 3/1985 |
| JP | 63-113739 A | 5/1988 |

(Continued)

*Primary Examiner* — Kamran Afshar
*Assistant Examiner* — Farid Seyedvosoghi
(74) *Attorney, Agent, or Firm* — Arent Fox LLP

(57) ABSTRACT

A radio communication device including: a first memory to store a plurality of program modules into which a first program is divided, the first program providing a first radio access technology (RAT), a second memory to store a second program providing a second RAT for executing, a first processor to input a command to a second processor when a RAT used by the radio communication device is changed from the second RAT to the first RAT, the second processor to execute a program or a program module that is stored in the second memory, wherein the first processor predicts the command based on a communication state of the radio communication device, selects at least one preferential program module among the plurality of program modules based on the predicted command, and controls to load the at least one preferential program module from the first memory to the second memory preferentially.

15 Claims, 16 Drawing Sheets

(56) References Cited

U.S. PATENT DOCUMENTS

| | | | | |
|---|---|---|---|---|
| 2011/0122812 A1* | 5/2011 | Jeong | ............ | H04W 36/18 |
| | | | | 370/328 |
| 2012/0214527 A1* | 8/2012 | Meylan | ............ | H04L 69/32 |
| | | | | 455/509 |
| 2015/0319647 A1* | 11/2015 | Kekki | ............ | H04W 36/14 |
| | | | | 370/236 |

FOREIGN PATENT DOCUMENTS

| JP | 3-227285 | 10/1991 |
|---|---|---|
| JP | 2003-333663 A | 11/2003 |
| JP | 2004-227173 A | 8/2004 |
| JP | 2005-223788 A | 8/2005 |

\* cited by examiner

FIG. 11A

| (1) | INDICATING WITHIN/OUT OF ZONE<br>0: WITHIN ZONE<br>1: OUT OF ZONE |
|---|---|
| (2) | INDICATING RRC MODE<br>0: Idle mode (NOT CONNECTED)<br>1: Connected mode (CONNECTED)<br>2: Recovery (RECONNECTED) |
| (3) | INDICATING TYPE OF PLMN<br>0:Home PLMN<br>1:Visited PLMN |
| (4) | INDICATING PROVIDED SERVICE<br>0:CS<br>1:PS<br>2:CS and PS<br>※FIXED TO 1 WHEN LOCATED WITHIN LTE NETWORK |
| (5) | INDICATING Attached DOMAIN<br>INITIAL VALUE:NULL<br>0:CS<br>1:PS<br>2:CS and PS<br>※FIXED TO 1 WHEN LOCATED WITHIN LTE NETWORK |
| (6) | INDICATING CURRENT LOCATION REGISTRATION STATE<br>[WHEN LOCATED WITHIN LTE NETWORK] (WHEN SET TO 26)<br>0: Deregistered - LOCATION UNREGISTERED STATE (Attach OPERATION ENABLED)<br>1: Normal - LOCATION REGISTERED STATE<br>2: Initialize - PREPARATORY STATE BEFORE START OF LOCATION REGISTRATION AFTER POWER-ON OF MOBILE DEVICE<br>3: Updating - DURING LOCATION REGISTRATION PROCESSING<br>4: AccCtrl - LOCATION REGISTRATION PROCESSING IS DIFFICULT TO BE STARTED DUE TO REGULATION<br>5: AttemptingN - LOCATION REGISTRATION PROCESSING HAS FAILED FOR SPECIFIED NUMBER OF TIMES<br>6: MaxAttempt - Attempt Counter HAS REACHED UPPER LIMIT AND LOCATION REGISTRATION HAS FAILED<br>7: SimInvalid - SIM UNAUTHORIZED STATE OR NO-SIM STATE DUE TO Attach Reject<br>8: CampOnAnyCell - camp on STATE IN Acceptable Cell<br>(other value):Reserved |
| (7) | INDICATING RAT TRANSITION DESTINATION INSTRUCTED BY PS<br>0: WCDMA (CURRENT STATE)<br>1: WCDMA (CURRENT STATE) → LTE<br>2: LTE (CURRENT STATE)<br>3: LTE (CURRENT STATE) → WCDMA |

FIG. 11B

| | |
|---|---|
| (1) | 1 |
| (2) | 0 |
| (3) | 0 |
| (4) | 1 |
| (5) | 0 |
| (6) | 3 |
| (7) | 2 |

| No | COMMAND ISSUANCE (FROM RADIO CPU SOFTWARE TO RADIO FIRMWARE) | COMMAND RESPONSE (FROM RADIO FIRMWARE TO RADIO CPU SOFTWARE) | PREFETCHING NOTIFICATION INFORMATION (FROM TAF TO RADIO CPU SOFTWARE) | RADIO CONTROL EXECUTION FIRMWARE | SEARCH FW | DEMO FW | DECODER FW | CODER FW | MOD FW |
|---|---|---|---|---|---|---|---|---|---|
| 1 | LB_PBCH_OPEN_REQ (P-BCH OPEN REQUEST) | BL_PBCH_OPEN_RES (P-BCH OPEN RESPONSE) | (1) WITHIN ZONE, (2) Idlemode, (3) Home PLMN, (7) LTE (CURRENT STATE) | O | – | O | O | – | – |
| 2 | LB_PBCH_CLOSE_REQ (P-BCH CLOSE REQUEST) | BL_PBCH_CLOSE_RES (P-BCH CLOSE RESPONSE) | (1) WITHIN ZONE, (2) Idlemode, (3) Home PLMN, (7) LTE (CURRENT STATE) | O | – | O | O | – | – |
| 3 | LB_DBCH_OPEN_REQ (D-BCH OPEN REQUEST) | BL_DBCH_OPEN_RES (D-BCH OPEN RESPONSE) | (1) WITHIN ZONE, (2) Idlemode, (3) Home PLMN, (7) LTE (CURRENT STATE) | O | – | O | O | – | – |
| 4 | LB_DBCH_CLOSE_REQ (D-BCH CLOSE REQUEST) | BL_DBCH_CLOSE_RES (D-BCH CLOSE RESPONSE) | (1) WITHIN ZONE, (2) Idlemode, (3) Home PLMN, (7) LTE (CURRENT STATE) | O | – | O | O | – | – |
| 5 | LB_SCH_OPEN_REQ (DL/UL-SCH OPEN REQUEST) | BL_SCH_OPEN_RES (DL/UL-SCH OPEN RESPONSE) | (1) WITHIN ZONE, (2) Idlemode, (3) Home PLMN, (7) WCDMA→LTE (CURRENT STATE) | O | – | O | O | O | O |
| 6 | LB_SCH_MODIFY_REQ (DL/UE-SCH MODIFY REQUEST) | BL_SCH_MODIFY_RES (DL/UE-SCH MODIFY RESPONSE) | (1) WITHIN ZONE, (2) Idlemode, (3) Home PLMN, (7) LTE (CURRENT STATE) | O | – | O | O | O | O |
| 7 | LB_SCH_CLOSE_REQ (DL/UL-SCH CLOSE REQUEST) | BL_SCH_CLOSE_RES (DL/UL-SCH CLOSE RESPONSE) | (1) WITHIN ZONE, (2) Connectedmode, (3) Home PLMN, (7) LTE (CURRENT STATE)→WCDMA/ (1) WITHIN ZONE, (2) Connectedmode, (3) Home PLMN, (7) WCDMA (CURRENT STATE) | O | – | O | O | O | O |
| 8 | LB_PCH_OPEN_REQ (PCH OPEN REQUEST) | BL_PCH_OPEN_RES (PCH OPEN RESPONSE) | (1) WITHIN ZONE, (2) Connectedmode, (3) Home PLMN, (7) LTE (CURRENT STATE)→WCDMA/ (1) WITHIN ZONE, (2) Connectedmode, (3) Home PLMN, (7) WCDMA (CURRENT STATE) | O | – | O | O | – | – |
| 9 | LB_PCH_CLOSE_REQ (PCH CLOSE REQUEST) | BL_PCH_CLOSE_RES (PCH CLOSE RESPONSE) | (1) WITHIN ZONE, (2) Connectedmode, (3) Home PLMN, (7) LTE (CURRENT STATE)→WCDMA/ (1) WITHIN ZONE, (2) Connectedmode, (3) Home PLMN, (7) WCDMA (CURRENT STATE) | O | – | O | O | – | – |

FIG. 13A

| No | BB STATE | COMMAND ISSUANCE (FROM RADIO CPU SOFTWARE TO RADIO FIRMWARE) | COMMAND RESPONSE (FROM RADIO FIRMWARE TO RADIO CPU SOFTWARE) | PREFETCHING NOTIFICATION INFORMATION (FROM TAF TO RADIO CPU SOFTWARE) | SEARCH FW | DEMO FW | FRCODER FW | CODER FW | MOD FW |
|---|---|---|---|---|---|---|---|---|---|
| 1 | PCH (DL TrCH=PCH, UL TrCH=None) open | RD_ECOMCH_SET_REQ (EXE_MODE=Open) | DR_ECOMCH_SET_CNF | (1) WITHIN ZONE, (2) Idlemode, (3) Home PLMN, (7) WCDMA (CURRENT STATE) | O | - | O | - | - |
| 2 | PCH (DL TrCH=PCH, UL TrCH=None) close | RD_ECOMCH_SET_REQ (EXE_MODE=Close) | DR_ECOMCH_SET_CNF | (1) WITHIN ZONE, (2) Idlemode, (3) Home PLMN, (7) LTE (CURRENT STATE) | - | - | - | - | - |
| 3 | PCH (DL TrCH=HS-DSCH, UL TrCH=None) open | RD_ECOMCH_SET_REQ (EXE_MODE=Open) | DR_ECOMCH_SET_CNF | (1) WITHIN ZONE, (2) Idlemode, (3) Home PLMN, (7) LTE (CURRENT STATE) | O | O | O | - | - |
| 4 | PCH (DL TrCH=HS-DSCH, UL TrCH=None) Close | RD_ECOMCH_SET_REQ (EXE_MODE=Close) | DR_ECOMCH_SET_CNF | (1) WITHIN ZONE, (2) Idlemode, (3) Home PLMN, (7) LTE (CURRENT STATE) | - | - | - | - | - |
| 5 | FACH (DL TrCH=FACH, UL TrCH=RACH) open | RD_ECOMCH_SET_REQ (EXE_MODE=Open) | DR_ECOMCH_SET_CNF | (1) WITHIN ZONE, (2) Idlemode, (3) Home PLMN, (7) WCDMA→LTE (CURRENT STATE) | O | - | O | O | O |
| 6 | FACH (DL TrCH=FACH, UL TrCH=RACH) Close | RD_ECOMCH_SET_REQ (EXE_MODE=Close) | DR_ECOMCH_SET_CNF | (1) WITHIN ZONE, (2) Idlemode, (3) Home PLMN, (7) WCDMA (CURRENT STATE) | - | - | - | - | - |
| 7 | FACH (DL TrCH=HS-DSCH, UL TrCH=RACH) open | RD_ECOMCH_SET_REQ (EXE_MODE=Open) | DR_ECOMCH_SET_CNF | (1) WITHIN ZONE, (2) Idlemode, (3) Home PLMN, (7) LTE (CURRENT STATE) | O | O | O | O | O |
| 8 | FACH (DL TrCH=FACH, UL TrCH=E-DCH) Cise | RD_ECOMCH_SET_REQ (EXE_MODE=Close) | DR_ECOMCH_SET_CNF | (1) WITHIN ZONE, (2) Idlemode, (3) Home PLMN, (7) LTE (CURRENT STATE) | O | O | O | O | O |
| 9 | FACH (DL TrCH=FACH, UL TrCH=None) open | RD_ECOMCH_SET_REQ (EXE_MODE=Open) | DR_ECOMCH_SET_CNF | (1) WITHIN ZONE, (2) Idlemode, (3) Home PLMN, (7) LTE (CURRENT STATE) | O | - | O | - | - |
| 10 | FACH (DL TrCH=HS-DSCH, UL TrCH=None) Cise | RD_ECOMCH_SET_REQ (EXE_MODE=Close) | DR_ECOMCH_SET_CNF | (1) WITHIN ZONE, (2) Idlemode, (3) Home PLMN, (7) LTE (CURRENT STATE) | O | O | O | - | - |

FIG. 13B

| No | BB STATE | COMMAND ISSUANCE (FROM RADIO CPU SOFTWARE TO RADIO FIRMWARE) | COMMAND RESPONSE (FROM RADIO FIRMWARE TO RADIO CPU SOFTWARE) | PREFETCHING NOTIFICATION INFORMATION (FROM TAF TO RADIO CPU SOFTWARE) | SEARCH FW | DEMO FW | RCODER FW | CODER FW | MOD FW |
|---|---|---|---|---|---|---|---|---|---|
| 11 | FACH (DL TrCH=HS-DSCH and SCCPCH,UL TrCH=None) open | RD_ECOMCH_SET_REQ (EXE_MODE=Open) | DR_ECOMCH_SET_CNF | (1) WITHIN ZONE, (2) Idlemode, (3) Home PLMN, (7) WCDMA (CURRENT STATE) | ○ | ○ | ○ | – | – |
| 12 | FACH (DL TrCH=HS-DSCH and SCCPCH,UL TrCH=None) Close | RD_ECOMCH_SET_REQ (EXE_MODE=Close) | DR_ECOMCH_SET_CNF | (1) WITHIN ZONE, (2) Idlemode, (3) Home PLMN, (7) LTE (CURRENT STATE) | – | – | – | – | – |
| 13 | DCH Open | RD_DCH_SET_REQ (EXE_MODE=Open) | DR_DCH_SET_CNF | (1) WITHIN ZONE, (2) Connectedmode, (3) Home PLMN, (7) LTE (CURRENT STATE)→WCDMA/ (1) WITHIN ZONE, (2) Connectedmode, (3) Home PLMN, (7) WCDMA (CURRENT STATE) | ○ | – | ○ | ○ | ○ |
| 14 | DCH Close | RD_ECOMCH_SET_REQ (EXE_MODE=Close) | DR_DCH_SET_CNF | (1) WITHIN ZONE, (2) Connectedmode, (3) Home PLMN, (7) WCDMA (CURRENT STATE)→LTE/ (1) WITHIN ZONE, (2) Connectedmode, (3) Home PLMN, (7) WCDMA (CURRENT STATE) | – | – | – | – | – |
| 15 | HS_DSCH open | RD_HS_DSCH_SET_REQ (EXE_MODE=Open) | DR_HS_DSCH_SET_CNF | (1) WITHIN ZONE, (2) Connectedmode, (3) Home PLMN, (7) LTE (CURRENT STATE)→WCDMA/ (1) WITHIN ZONE, (2) Connectedmode, (3) Home PLMN, (7) WCDMA (CURRENT STATE) | – | – | ○ | – | – |
| 16 | HS_DSCH close | RD_HS_DSCH_SET_REQ (EXE_MODE=Close) | DR_HS_DSCH_SET_CNF | (1) WITHIN ZONE, (2) Connectedmode, (3) Home PLMN, (7) WCDMA (CURRENT STATE)→LTE/ (1) WITHIN ZONE, (2) Connectedmode, (3) Home PLMN, (7) WCDMA (CURRENT STATE) | ○ | ○ | ○ | ○ | ○ |

FIG. 13C

| No | BB STATE | COMMAND ISSUANCE (FROM RADIO CPU SOFTWARE TO RADIO FIRMWARE) | COMMAND RESPONSE (FROM RADIO FIRMWARE TO RADIO CPU SOFTWARE) | PREFETCHING NOTIFICATION INFORMATION (FROM TAF TO RADIO CPU SOFTWARE) | SEARCH FW | DEMO FW | FRCODER FW | CODER FW | MOD FW |
|---|---|---|---|---|---|---|---|---|---|
| 17 | EDCH open | RD_EDCH_SET_REQ (EXE_MODE=Open) | DR_EDCH_SET_CNF | (1) WITHIN ZONE, (2) Connectedmode, (3) Home PLMN, (7) LTE (CURRENT STATE)→WCDMA/ (1) WITHIN ZONE, (2) Connectedmode, (3) Home PLMN, (7) WCDMA (CURRENT STATE) | ○ | ○ | ○ | ○ | ○ |
| 18 | EDCH Close | RD_EDCH_SET_REQ (EXE_MODE=Close) | DR_EDCH_SET_CNF | (1) WITHIN ZONE, (2) Idlemode, (3) Home PLMN, (7) LTE (CURRENT STATE)→WCDMA/ (1) WITHIN ZONE, (2) Connectedmode, (3) Home PLMN, (7) WCDMA (CURRENT STATE) | ○ | ○ | ○ | ○ | ○ |

RADIO COMMUNICATION DEVICE AND RADIO COMMUNICATION METHOD

CROSS-REFERENCE TO RELATED APPLICATION

This application is based upon and claims the benefit of priority of the prior Japanese Patent Application No. 2013-240876, filed on Nov. 21, 2013, the entire contents of which are incorporated herein by reference.

FIELD

The embodiments discussed herein are related to a radio communication device and a radio communication method.

BACKGROUND

In the field of radio communication, standardization of a communication standard called LTE (Long Term Evolution) and a communication standard called LTE-A (LTE-Advanced) based on LTE has been currently completed or considered in 3GPP (3rd Generation Partnership Project), in order to further improve a communication speed and communication capacity.

On the other hand, radio communication devices such as a smartphone are widely used. Such a radio communication device can use many radio communication schemes such as HSPA (High Speed Packet Access) and GSM (registered trademark) (Global System for Mobile communication), besides the radio communication scheme such as LTE, for example.

For example, the radio communication device can use many radio communication schemes by utilizing a software radio technology. The software radio is radio communication or a technology thereof capable of switching the radio communication scheme by changing control software without changing an electronic circuit (hardware), for example. The software radio can miniaturize the whole device without increasing the number of electronic circuits in the radio communication device, for example, and thus can also reduce costs.

Note that such switching of the radio communication scheme (or RAT (Radio Access Technology)) may be referred to as Inter-RAT (or inter-RAT handover) or the like, for example.

As to switching of the RAT, in the radio communication device, for example, whole radio control firmware related to the radio communication scheme after switching is loaded into a command memory (for example, IRAM (Intelligent RAM)) from a data memory (for example, DRAM (Dynamic Random Access Memory)). Then, the radio communication device uses the loaded whole radio control firmware or a part thereof to perform radio communication according to the radio communication scheme after switching.

In this case, as to the IRAM storing the radio control firmware after switching, for example, loading is performed after the IRAM is powered up again and rebooted, for example.

Therefore, when loading the whole radio control firmware related to the radio communication scheme after switching, for example, the IRAM is changed to a sleep state in the radio communication device, and then processing is performed, such as powering up the IRAM again.

As a technology related to the software radio, there is the following technology, for example.

The technology is provided with two modules: a basic module for realizing minimum software download using each communication system and an expansion module for realizing more sophisticated applications. The basic module is held normally and the expansion module is stored by communication using the basic module.

According to the technology described above, software download and management can be efficiently performed with smaller memory capacity, for example.

There is also a technology in which, when recognizing a reception condition or reception state such as a low power level of a received signal, a receiver transmits request information to a download center and receives optimum software corresponding to the request information from the download center to rewrite contents in a storage unit.

According to the technology described above, a software download system can be provided, which is capable of rewriting programs according to a communication status of the receiver, for example.

Furthermore, there is also a technology in which, after a communication device is turned on, algorithm 1 is downloaded to store channel capacity information in a storage unit, then algorithm 2 is downloaded to store channel capacity information in the storage unit, and the two channel capacities are compared to select any one of the algorithms.

According to the technology described above, one terminal system or radio unit is allowed to use many CDMA communication systems, for example, and an optimum radio system can be selected according to a communication situation.

Meanwhile, there is a technology called a memory overlay method. In the memory overlay method, when a program is difficult to be stored in a memory, for example, the program is divided into segment (module) files for each function, and the program itself manages and controls each of the segments.

As a technology related to the memory overlay method, there is the following technology, for example.

Specifically, there is a form editing device configured to edit a machine code for a page printer to create a machine code for a serial printer.

According to the technology described above, form overlay print can be performed in the serial printer, for example.

There is also an OS overlay method in which, when a corresponding input-output driver is yet to be loaded in case of an input-output request, a FIFO register stores to that effect, and after multiple interrupt is resolved, a management unit reads the FIFO register and the input-output driver is loaded and operated.

According to the technology described above, the OS can be operated in a small execution area using a normal disk driver, for example.

There is also an information output device including a memory configured to exclusively store at least overlay information and a synthesizing unit configured to read and synthesize information stored in an image memory and the overlay information, wherein the synthesizing unit overlaps the overlay information with the information stored in the image memory and outputs the information thus obtained.

According to the technology described above, an overlay method for the information output device can be provided, which can improve the processing speed, simplify the control of hardware, and economically handle output information such as image information and graphic information, for example.

Japanese Laid-open Patent Publication No. 2005-223788, Japanese Laid-open Patent Publication No. 2004-227173, Japanese Laid-open Patent Publication No. 2003-333663, Japanese Laid-open Patent Publication No. 03-227285, Japanese Laid-open Patent Publication No. 63-113739, Japanese Laid-open Patent Publication No. 60-42791 are examples of related art.

SUMMARY

According to an aspect of the invention, a radio communication device includes a first memory configured to store a plurality of program modules into which a first program is divided, the first program providing a first radio access technology, a second memory configured to store a second program providing a second radio access technology for executing, a first processor configured to input a command to a second processor when a radio access technology used by the radio communication device is changed from the second radio access technology to the first radio access technology, the second processor configured to execute a program or a program module that is stored in the second memory, wherein the first processor is configured to predict the command based on a communication state of the radio communication device, select at least one preferential program module among the plurality of program modules based on the predicted command, and control to load the at least one preferential program module from the first memory to the second memory preferentially, and the second memory is configured to store the at least one preferential program module loaded from the first memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11A is a diagram illustrating an example of items stored in a current information table and FIG. 11B is a diagram illustrating a configuration example of the current information table;

FIG. 12 is a diagram illustrating an example of a channel state transition command information table for LTE;

FIGS. 13A to 13C are diagrams illustrating an example of a channel state transition command information table for WCDMA.

DESCRIPTION OF EMBODIMENTS

However, in the radio communication device, when loading the whole radio firmware corresponding to the radio communication scheme after switching, loading takes time compared with the case of loading a part of the firmware, since the whole radio firmware is loaded.

Moreover, in this case, the radio communication device performs i) transition to a sleep state, ii) power-up of the IRAM and iii) reboot of the IRAM every time the radio communication scheme is switched. Thus, processing time from start to end of the switching of the radio communication scheme reaches a threshold or more. In such a case, in the radio communication device, an amount of consumption current may be increased or data to be transmitted or received within the processing time may be wasted.

Moreover, as to the technology related to software radio described above, there is no discussion about reduction in processing time for switching of the radio communication scheme. Therefore, the technology related to software radio described above has difficulty in reducing the processing time for switching of the radio communication scheme.

Note that, in the technology to store the expansion module by the communication using the basic module, among the technologies related to software radio, a memory for the size to store the expansion module, for example, is separately provided, leading to an increase in memory capacity.

Furthermore, as to the technology related to the memory overlay method described above, again, there is no discussion about reduction in processing time for switching of the radio communication scheme. Therefore, it is difficult to reduce the processing time for switching of the radio communication scheme.

Therefore, one aspect of the embodiments is to provide a radio communication device and a method for controlling switch of a radio communication scheme, which can reduce processing time for switching of the radio communication scheme.

Moreover, another aspect of the embodiments is to provide a radio communication device and a method for controlling switch of a radio communication scheme, which can suppress an increase in memory capacity.

Embodiments are described below. First, a configuration example of a processing device according to this embodiment is described. Then, an example of vector data creation processing performed in the processing device is described.

First Embodiment

Figure 1:
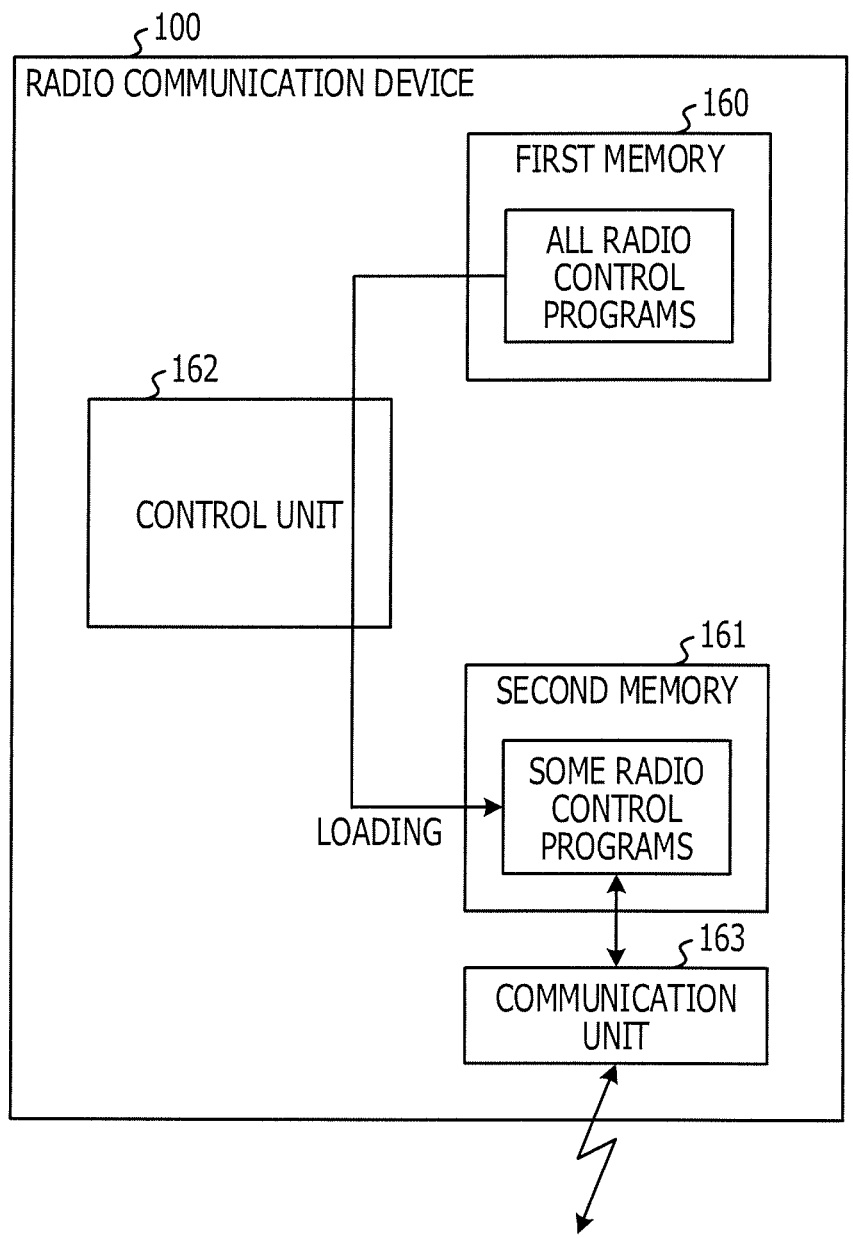
FIG. 1 is a diagram illustrating a configuration example of a terminal device.

A first embodiment is described. FIG. 1 is a diagram illustrating a configuration example of a radio communication device 100 according to the first embodiment.

The radio communication device 100 includes a first memory 160, a second memory 161, a communication unit 163 and a control unit 162. When switching a radio communication scheme from a first radio communication scheme to a second radio communication scheme, the radio communication device 100 loads a radio control program about the second radio communication scheme, which is stored in the first memory 160, into the second memory 161.

Then, the radio communication device 100 uses the loaded radio control program to perform radio communication using the second radio communication scheme.

In the first memory 160, radio control programs that specify radio processing according to the radio communication scheme are stored while being grouped into predetermined execution units. Also, some of the radio control programs stored in the first memory 160 are loaded into the second memory 161 under the control of the control unit 162.

The communication unit 163 performs the radio processing according to the radio communication scheme by executing the radio control programs loaded into the second memory 161.

The control unit 162 performs control processing to control such that a command to be inputted after switching of the radio communication scheme is specified based on a communication status of the radio communication device 100 and a radio control program corresponding to the specified command is loaded into the second memory 161 from the first memory 160 before input of the command.

The radio communication device 100 loads the radio control program corresponding to the specified command, in preference to other programs, into the second memory 161 from the first memory 160. Thus, the radio control program can be executed without waiting for a radio control program less involved with a command to be issued next to be loaded.

Therefore, processing time can be reduced when there arises a desire to update the radio control program stored in the second memory 161, such as switching of the radio communication scheme, for example.

Among a number of radio control programs corresponding to predetermined divided sections of the processing according to the radio communication scheme, only the radio control program corresponding to the specified command is set to be a loading target. Accordingly, even when switching the radio communication scheme from the first radio communication scheme to the second radio communication scheme, a series of processing can be omitted, such as i) transition to a sleep state, ii) power-up of the second memory 161 and iii) reboot of the second memory 161, for example. Thus, processing time for switching of the radio communication scheme can be reduced.

Moreover, as to the radio control program to be loaded, the radio communication device 100 loads some radio control programs, rather than all radio control programs corresponding to the second radio communication scheme.

Therefore, since the radio communication device 100 loads some radio control programs, the processing time for switching of the radio communication scheme can be reduced compared with the case of loading all the radio control programs, for example.

Furthermore, the radio communication device 100 does not increase a storage area of the second memory 161 or load the radio control programs into another memory when loading the radio control programs into the second memory 161.

Therefore, the radio communication device 100 can suppress an increase in memory capacity.

Second Embodiment

Next, a second embodiment is described. First, a configuration example of a radio communication system 10 is described.

<Configuration Example of Radio Communication System 10>

Figure 2:
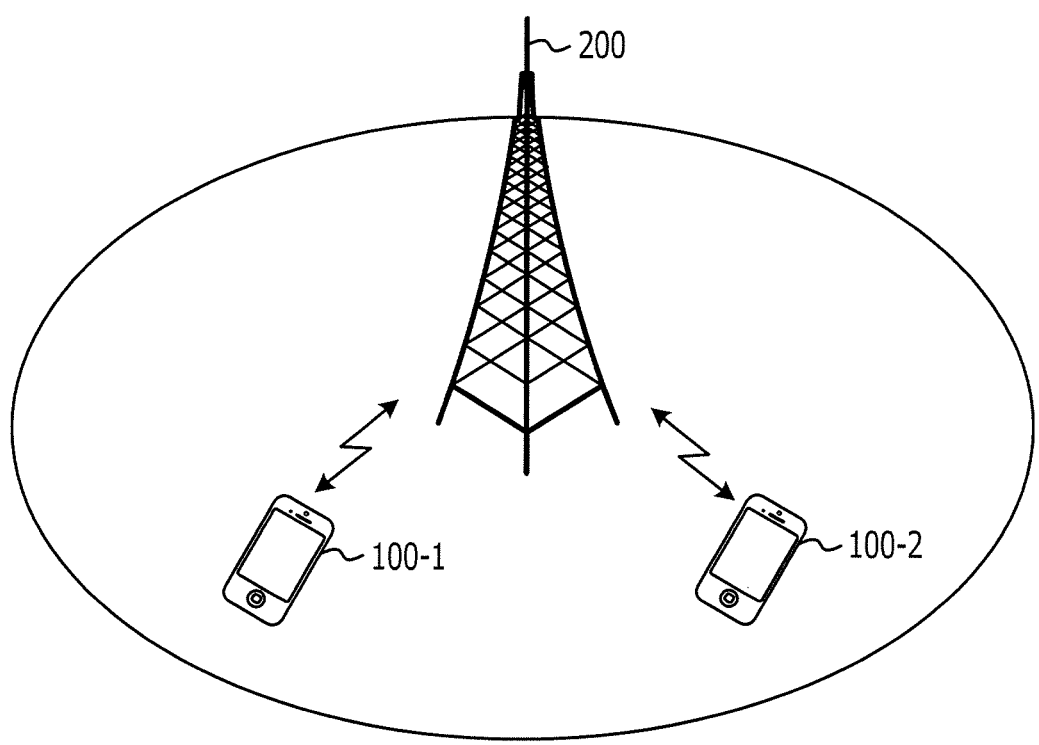
FIG. 2 is a diagram illustrating a configuration example of a radio communication system.

FIG. 2 is a diagram illustrating the configuration example of the radio communication system 10 according to the second embodiment. The radio communication system 10 includes terminal devices (hereinafter may be called the "terminals") 100-1 and 100-2, and a base station device (hereinafter may be called the "base station") 200.

The terminals 100-1 and 100-2 are mobile radio communication devices, such as a feature phone, a smartphone and a personal computer, for example. The terminals 100-1 and 100-2 can perform radio communication with the base station 200 within a radio communicable range (or a cell range) of the base station 200, and can be provided with various services from the base station 200.

Note that the terminals 100-1 and 100-2 are also radio communication devices capable of using a software radio technology, for example. For example, the terminals 100-1 and 100-2 can perform radio communication by switching between radio communication schemes such as LTE, HSPA and GSM, as appropriate. Each of the terminals 100-1 and 100-2 holds radio control firmware corresponding to each of the radio communication schemes. The terminals 100-1 and 100-2 are described in detail later.

The base station 200 is a radio communication device configured to perform radio communication with the terminals 100-1 and 100-2 within its own cell range. The base station 200 can perform two-way communication with the terminals 100-1 and 100-2 within the cell range. More specifically, the two-way communication includes data transmission (or downlink communication) from the base station 200 to the terminals 100-1 and 100-2 and data transmission (or uplink communication) from the terminals 100-1 and 100-2 to the base station 200.

Note that the base station 200 may be further connected to a CN (Corresponding Node), an RNC (Radio Network Controller) or another base station through a wired line.

Although the two terminals 100-1 and 100-2 are illustrated in the example of FIG. 2, the number of the terminals 100-1 and 100-2 to be connected to the base station 200 may be one or three or more in the radio communication system 10.

Note that the terminals 100-1 and 100-2 both have the same configuration, and thus may be described as the terminal 100 unless otherwise noted.

<Configuration Example of Terminal 100>

Next, a configuration example of the terminal 100 is described.

Figure 3:
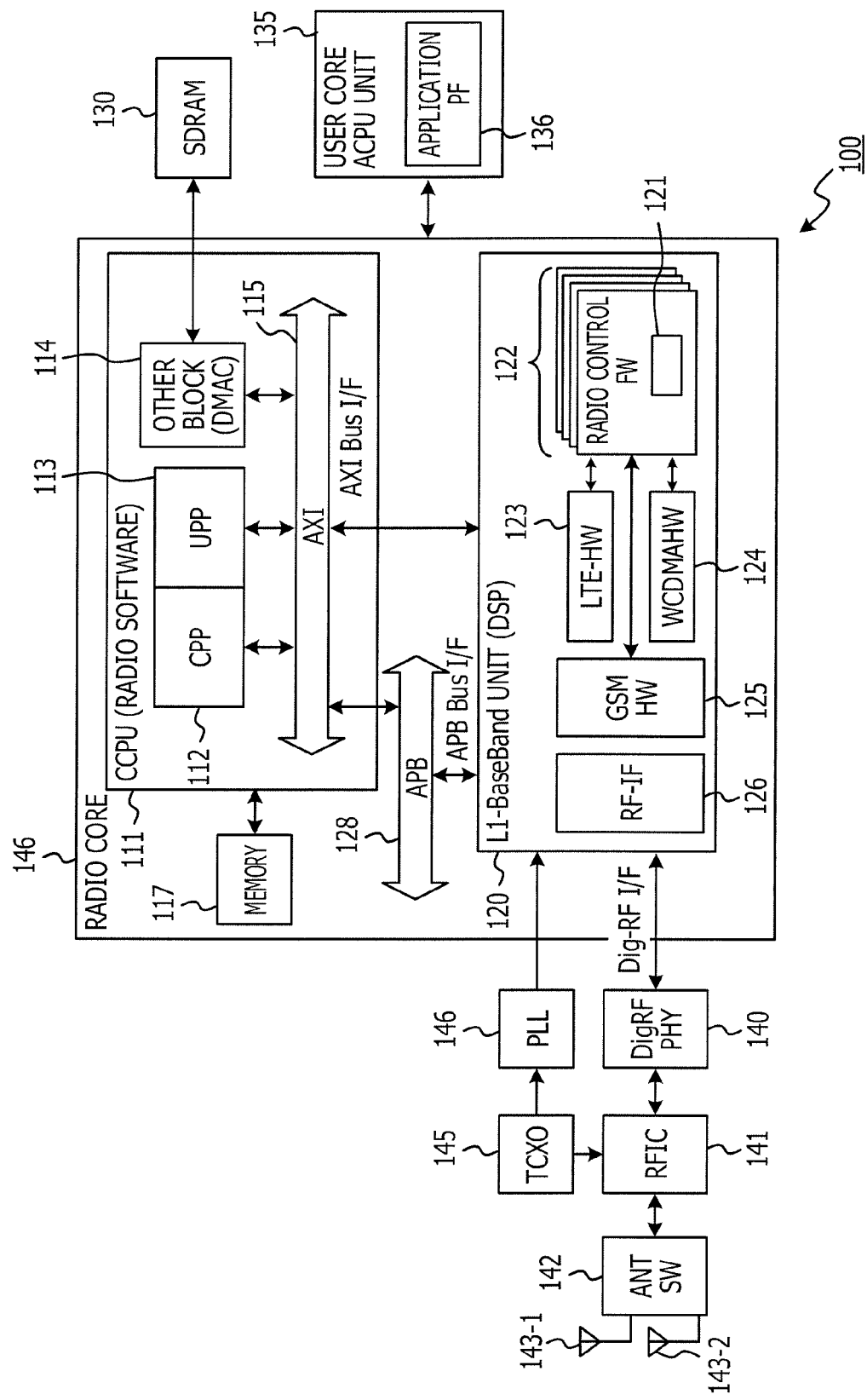
FIG. 3 is a diagram illustrating a configuration example of a terminal device.

FIG. 3 is a diagram illustrating the configuration example of the terminal 100. The terminal 100 includes a radio core unit 110, an SDRAM (Synchronous Dynamic Random Access Memory) 130, a user core unit (ACPU (Application Central Processing Unit)) 135, a DigRF PHY (Digital Radio Frequency PHYsical) unit 140, an RFIC (Radio Frequency Integrated Circuit) 141, an ANT SW (Antenna Switch) 142, antennas 143-1 and 143-2, a TCXO (Temperature Compensated crystal Oscillator) 145, and a PLL (Phase Lock Loop) 146.

The radio core unit 110 includes a CCPU (Communication CPU) 111, a memory 117, a L1 (Layer 1)-BaseBand unit 120, and an APB (Advance Peripheral Bus) 128.

The CCPU 111 includes a CPP (C-Plane Program) 112, a UPP (U-Plane Program) 113, Other Block 114, and an AXI (Advanced extensible Interface) bus 115.

The L1-BaseBand unit 120 includes an IRAM (Intelligent Random Access Memory) 121, a radio control firmware (FW: Firm Ware) 122, an LTE-HW (Long Term Evolution Hard Ware) 123, a WCDMA HW (Wideband Code Division Multiple Access Hard Ware) 124, a GSM HW (Global System for Mobile Communications Hard Ware) 125, and an RF-IF (Radio Frequency Interface) 126. Note that the radio control firmware 122 is stored in the IRAM 121, for example.

The user core unit 135 includes an Application PF (Plat Form) 136, for example.

Note that the radio communication device 100 in the first embodiment corresponds to the terminal 100, for example. Moreover, the first and second memories 160 and 161 in the first embodiment correspond to the SDRAM 130 and the IRAM 121, respectively, for example. Furthermore, the control unit 162 in the first embodiment corresponds to the CCPU 111, for example.

The terminal 100 can perform radio communication using several radio communication schemes utilizing the software radio. For example, the terminal 100 performs the following operations to switch between the radio communication schemes (or switch RATs).

Specifically, the SDRAM 130 stores an LTE radio control firmware 122, a WCDMA (e.g., HSPA) radio control firmware 122 and a GSM radio control firmware 122. In the Other Block, a DMAC (Direct Memory Access Controller) 114 controls access to the SDRAM 130 according to an instruction from the CPP 112, for example. For example, the DMAC 114 reads the radio control firmware 122 for the radio communication scheme after RAT switching, according to the instruction from the CPP 112, and outputs the read firmware to the IRAM 121 through the AXI bus 115 and the like. The L1-BaseBand unit 120 uses the radio control firmware 122 loaded into the IRAM 121 to perform processing related to radio communication. The loading is described in detail later.

The respective units in the terminal 100 are described. The CPP 112 is a program to perform processing on C-Plane, for example, and is executed by the CCPU 111 to perform the processing on C-Plane. The processing on C-Plane includes call establishment, transmission line establishment, handover control and the like, for example.

The UPP 113 is a program to perform processing on U-Plane, for example, and is executed by the CCPU 111 to perform the processing on U-Plane. The processing on U-Plane includes processing of user data and the like.

The Other Block 114 is another processing block connected to the AXI bus 115, and includes the DMAC and the like, for example. As to the Other Block 114, again, predetermined programs are executed by the CCPU 111, for example, to realize functions of the Other Block 114 or execute processing.

The AXI bus 115 is connected to the CPP 112, the UPP 113, the Other Block 114, the APB 128 and the L1-BaseBand unit 120. The AXI bus 115 is standardized based on AMBA (AdvancedMicro controller Bus Architecture) 3.0 as a bus standard for connection between a processor and a memory, for example. The AXI bus 115 can transfer data and the like faster than the APB bus 128.

The memory 117 stores various tables, for example, and is referred to as appropriate by the CPP 112 during processing related to loading by the CPP 112 and the like. The tables stored in the memory 117 include a current status information table 1110, channel state transition command information tables 1111 and 1112, and the like. These tables are described in detail later.

The L1-BaseBand unit 120 is a processing block to perform processing of a baseband signal, for example. The L1-BaseBand unit 120 executes the radio control firmware 122 stored in the IRAM 121, for example, to operate the hardware such as the LTE-HW 123, the WCDMA HW 124, the GSM HW 125 or the like, thereby allowing for various kinds of processing related to the radio communication scheme such as LTE, WCDMA, GSM or the like.

The radio control firmware 122 is a program, software or the like to perform processing related to radio control, for example. The radio control firmware 122 is firmware to perform processing of generating a baseband signal by performing error-correcting coding, modulation and the like on user data and then performing demodulation, error-correcting decoding and the like on the baseband signal.

Note that the firmware is software or a program to control the hardware or system incorporated in the terminal 100, for example.

The LTE-HW 123 is LTE hardware or system to be controlled by the LTE radio control firmware 122, for example.

The WCDMA HW 124 is WCDMA hardware or system to be controlled by the WCDMA radio control firmware 122, for example.

The GSM HW 125 is GSM hardware or system to be controlled by the GSM radio control firmware 122, for example.

For example, the LTE-HW 123, the WCDMA HW 124 and the GSM HW 125 are hardware or systems incorporated in the L1-BaseBand unit 120.

The RF-IF unit 126 is an interface configured to input and output the baseband signal from and to the DigRF PHY unit 140. The RF-IF unit 126 outputs the baseband signal received from the DigRF PHY unit 140 to the hardware (LTE-HW 123, WCDMA HW 124, GSM HW 125 or the like) related to the operated radio communication scheme. Also, the RF-IF unit 126 receives the modulated baseband signal outputted from the hardware 123 to 125 related to the operated radio communication scheme, and outputs the received baseband signal to the DigRF PHY unit 140.

Note that the L1-BaseBand unit 120 performs various kinds of processing in synchronization with a clock signal outputted from the PLL 146.

The SDRAM 130 stores LTE total radio control firmware, WCDMA total radio control firmware and GSM total radio control firmware, for example. The radio control firmware stored in the SDRAM 130 is read as appropriate by the DMAC 114, for example.

The user core unit 135 is also an ACPU, for example, to realize functions of the Application PF 136 by executing a predetermined program. The Application PF 136 can generate a signal instructing an outgoing call, an incoming call and the like by a user operation, for example, and output the generated signal to the CPP 112 through the AXI bus 115.

Upon receipt of the baseband signal from the RFIC 141, the DigRF PHY unit 140 converts the baseband signal from an analog format to a digital format, and outputs the digital-format baseband signal to the L1-BaseBand unit 120. Also, the DigRF PHY unit 140 converts the digital-format baseband signal received from the L1-BaseBand unit 120 into an analog-format baseband signal, and outputs the analog-format baseband signal to the RFIC 141.

The RFIC 141 frequency-converts (or down-converts) a radio signal outputted from the ANT SW 142 into a baseband frequency signal, and outputs the signal to the DigRF PHY unit 140. Also, the RFIC 141 frequency-converts (or up-converts) the baseband signal outputted from the DigRF PHY unit 140 into a radio signal, and outputs the radio signal to the ANT SW 142. The RFIC 141 is also a frequency converter circuit, for example.

Note that the RFIC 141 can up-convert a transmission frequency to a radio frequency or down-convert a reception frequency to a baseband frequency by receiving and mixing an oscillation signal outputted from the TCXO 145.

The ANT SW 142 changes its output such that the radio signal outputted from the RFIC 141, for example, is outputted to either one of the antennas 143-1 and 143-2. Also, the ANT SW 142 changes its output such that one of the two radio signals received by the antennas 143-1 and 143-2 is outputted to the RFIC 141.

Alternatively, the ANT SW 142 outputs the radio signal outputted from the RFIC 141 to the two antennas 143-1 and 143-2 or outputs the two radio signals received by the two antennas 143-1 and 143-2 or either one of the two to the RFIC 141.

The antennas 143-1 and 143-2 receive radio signals transmitted from the base station 200 and outputs the received radio signals to the ANT SW 142. Also, the antennas 143-1 and 143-2 transmit the radio signals outputted from the ANT SW 142 to the base station 200.

<About Protocol Stack and Software Configuration>

Next, description is given of a protocol stack and a software configuration in the terminal 100.

Figure 4:
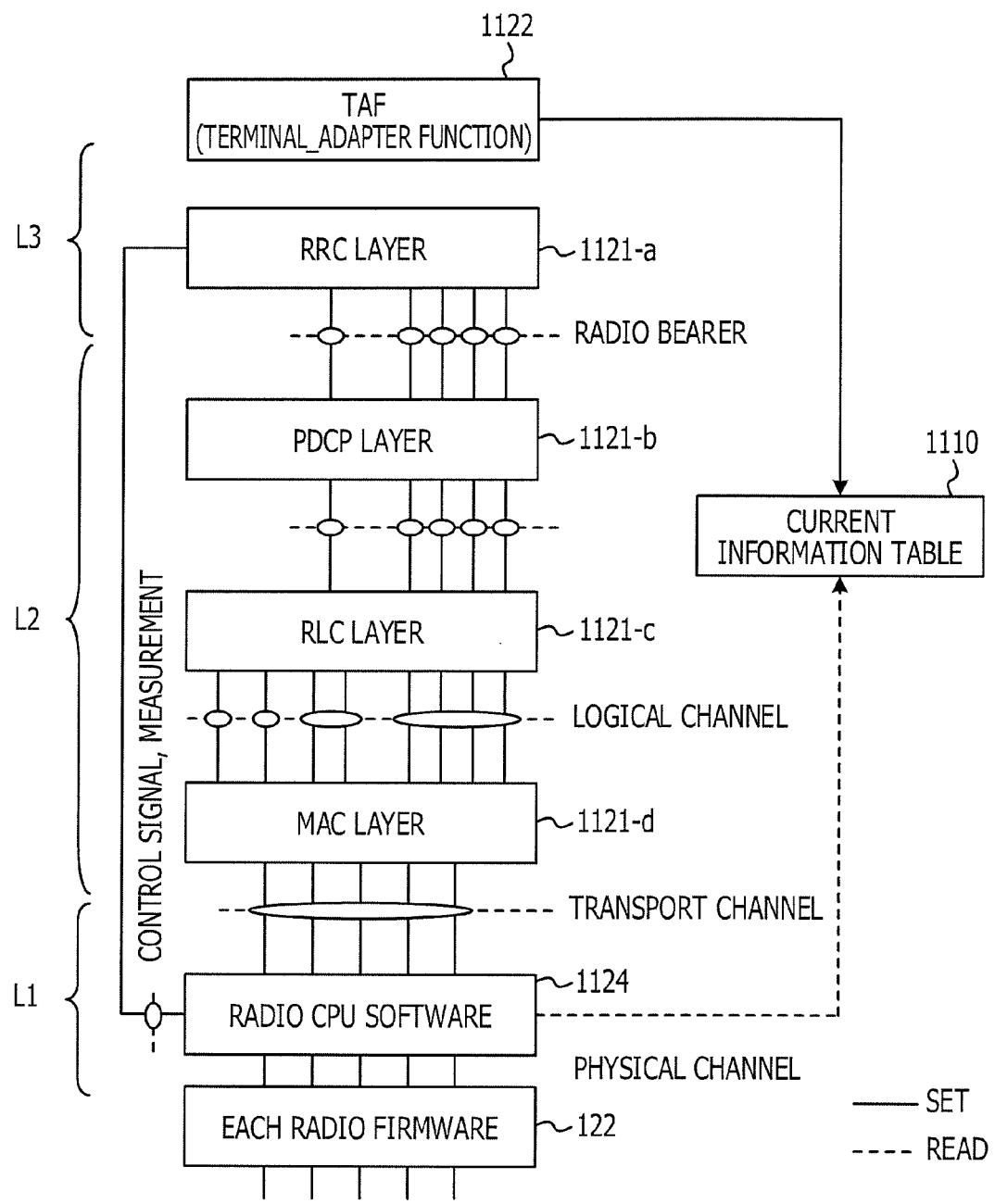
FIG. 4 is a diagram illustrating an example of a protocol stack and a software configuration.

FIG. 4 illustrates an example of the protocol stack and software configuration and also illustrates an example of a protocol stack for C-Plane.

The terminal 100 can handle control signals for four layers: an RRC (Radio Resource Control) layer 1121-*a*, a PDCP (Packet Data Convergence Protocol) layer 1121-*b*, an RLC (Radio Link Control) layer 1121-*c*, and a MAC (Media Access Control) layer 1121-*d*.

The RRC layer 1121-*a* performs processing such as call reception, management of connection to the base station 200, handover control and reconnection control, for example.

The PDCP layer 1121-*b* performs processing related to security (or confidentiality) of the control signals, for example, and the like.

The RLC layer 1121-*c* performs processing such as ARQ (Automatic Repeat reQuest) control on an RLC PDU (Packet Data Unit), for example.

The MAC layer 1121-*d* performs processing such as multiplexing and HARQ (Hybrid ARQ) control on the RLC PDU, for example.

The RRC layer 1121-*a* belongs to L3 (Layer 3), and the PDCP layer 1121-*b*, the RLC layer 1121-*c* and the MAC layer 1121-*d* belong to L2 (Layer 2). As to a control signal of a PHY (PHYsical) layer belonging to L1 (Layer 1), and the like, processing thereof is performed using radio CPU software 1124 or each radio control firmware 122.

A TAF (Terminal Adapter Function) 1122 performs various controls to establish a call between the terminal 100 and the base station 200 when start of a call (e.g., a circuit connection (CS (Circuit Switching)) call or a packet communication (PS (Packet Switching)) call) is instructed, for example. For example, the TAF 1122 instructs the RRC layer 1121-*a* to generate an outgoing call message in response to a user operation of the terminal 100 or the like. In this case, the RRC layer 1121-*a* generates the outgoing call message.

Also, the TAF 1122 stores various kinds of information in the current information table 1110 based on information received from the RRC layer 1121-*a* and information received from the ACPU 135, for example. The current information table 1110 is described in detail later. The information stored in the current information table 1110 is read as appropriate by the radio CPU software 1124, for example.

Note that the layers from the RRC layer 1121-*a* to the MAC layer 1121-*d* may be collectively referred to as a PS (protocol stack) 1121, for example.

Figure 5:
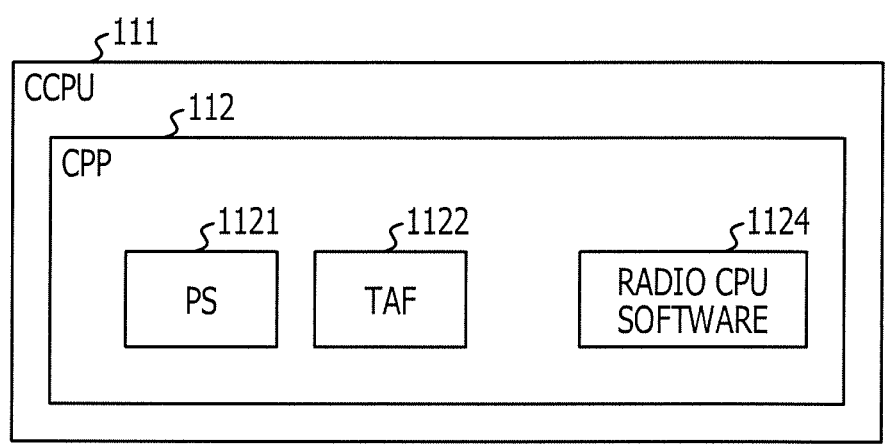
FIG. 5 is a diagram illustrating an example of a software configuration.

FIG. 5 is a diagram illustrating a software configuration example. The CPP 112 is executed in the CCPU 111 in the terminal 100. The CPP 112 includes the PS 1121, the TAF 1122 and the radio CPU software 1124, for example.

By executing a program related to the PS 1121, for example, in the CCPU 111, processing or functions performed in each of the layers from the RRC layer 1121-*a* to the MAC layer 1121-*d* can be realized. Moreover, by executing a program related to the TAF 1122 in the CCPU 111, processing or functions performed by the TAF 1122 can be realized. Furthermore, by executing a program related to the radio CPU software 1124 in the CCPU 111, processing or functions performed by the radio CPU software 1124 can be realized.

Note that description may be given below of a case where the PS 1121, the TAF 1122 or the radio CPU software 1124 performs processing. The PS 1121, the TAF 1122 or the radio CPU software 1124 performing the processing may be described as meaning that such processing is performed or such functions are realized by the CCPU 111 executing a program included in the CPP 112, for example.

<Channel State>

Figure 6:
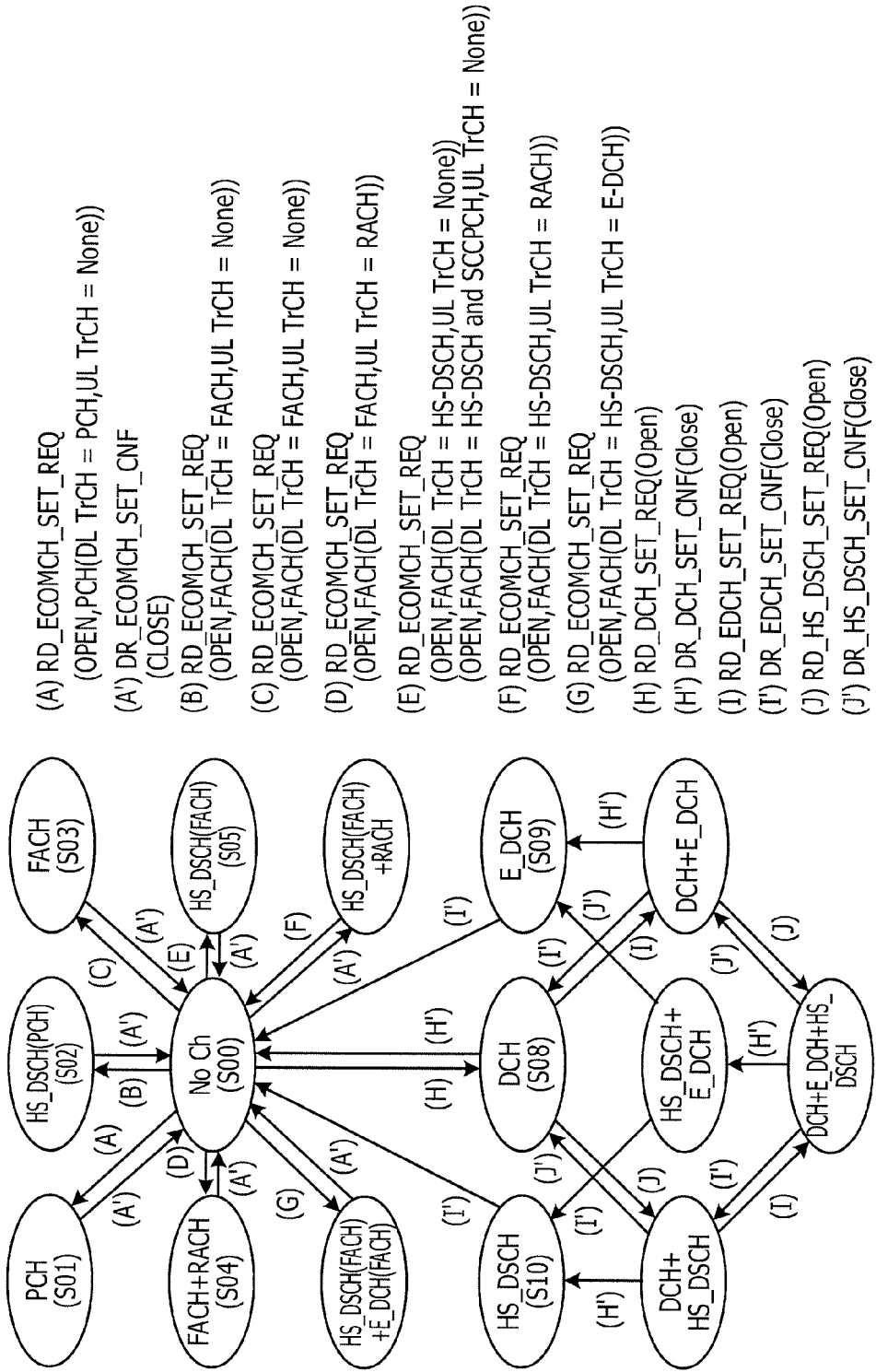
FIG. 6 is a diagram illustrating a transition example of a channel state.

FIG. 6 is a diagram illustrating a transition example of a channel state in the terminal 100. FIG. 6 mainly illustrates a transition example of a downlink channel state for WCDMA.

In "DCH (S08)" state, for example, the terminal 100 is in a synchronized state in a radio layer with the base station 200 and is capable of transmitting and receiving data and the like.

The arrows illustrated in FIG. 6 represent messages to be outputted to the radio control firmware 122 from the CCPU 111. Outputting such messages by the CCPU 111 enables transitions to respective states illustrated in FIG. 6.

For example, when the CCPU 111 outputs "RD_HS_D-SCH_REQ" message ((J) in FIG. 6) in "DCH (S08)" state, a transition is made to "DCH+HS_DSCH" state. In "DCH+HS_DSCH" state, the terminal 100 can receive user data using HSPA from the base station 200.

In FIG. 6, there is "No Ch (S00)" state. "No Ch (S00)" is a channel closed state, for example, where the terminal 100 can switch the RAT. For example, when the CCPU 111 outputs a close request message such as "DR_ECHOMCH_SET_CNF" message ((A') in FIG. 6) to the radio control firmware 122, a transition can be made to "No Ch (S00)" that is a RAT switchable state.

Operation Example

Next, an operation example in the terminal 100 is described. FIGS. 7 to 10 are sequence diagrams illustrating the operation example. The operation example is described in the following order.

Figure 7:
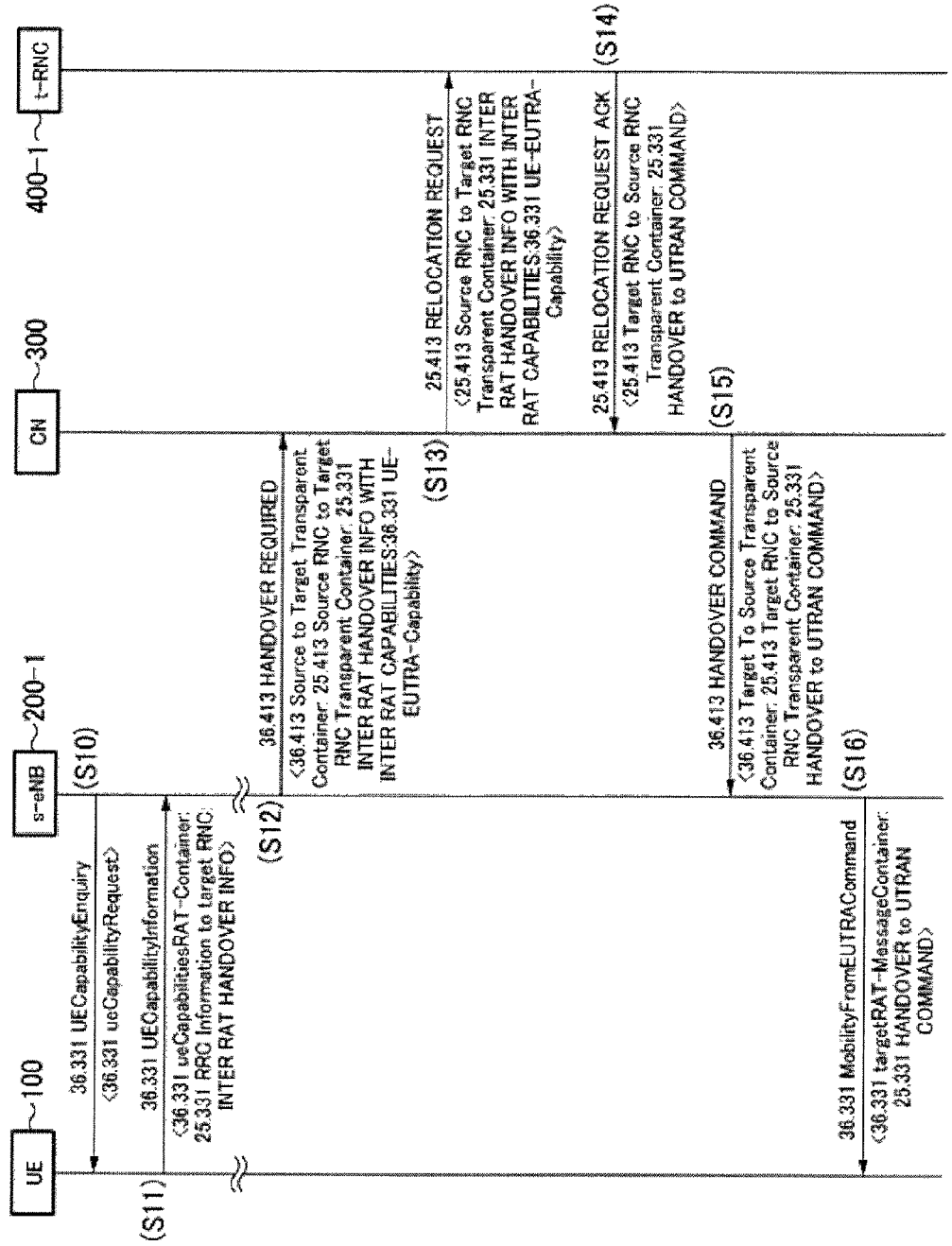
FIG. 7 is a sequence diagram illustrating an example of processing of switching from LTE to WCDMA (registered trademark)
Figure 8:
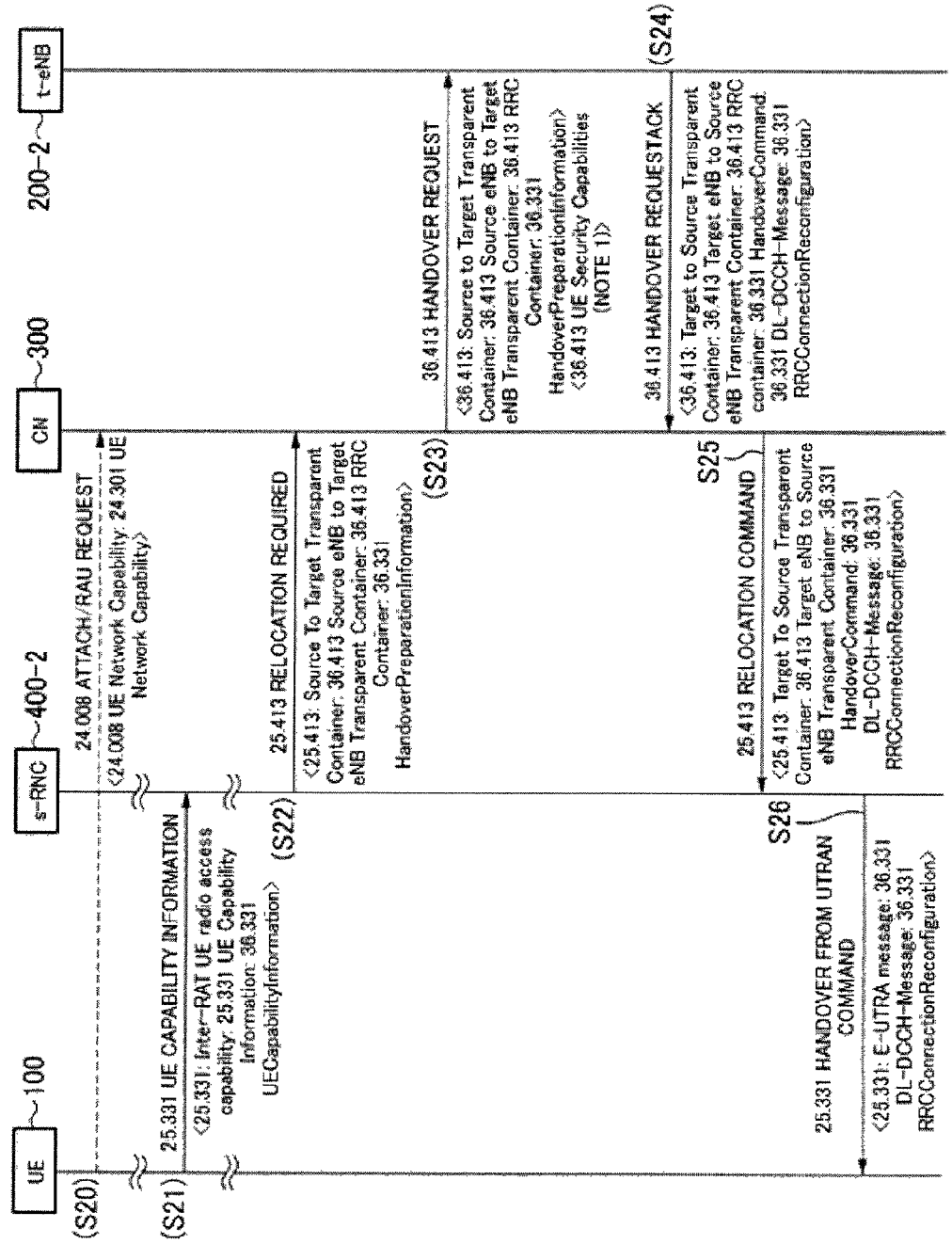
FIG. 8 is a sequence diagram illustrating an example of processing of switching from WCDMA to LTE.

Specifically, FIGS. 7 and 8 illustrate an operation sequence example between the terminal (UE) 100 and the base station (s-eNB and t-eNB) 200, and the like.

For example, the terminal 100 transmits a switch request for the radio communication scheme to the base station (s-eNB) 200-1 or a base station controller (s-RNC) 400-2. Then, upon receipt of a permission for the switch request from the base station (s-eNB) 200-1 or the base station controller (s-RNC) 400-2, the terminal 100 performs processing of switching the radio communication scheme within the terminal 100 illustrated in FIGS. 9 and 10.

Operation Example Between Terminal 100 and Base Station (s-eNB) 200-1 or Base Station Controller (s-RNC) 400-2

FIG. 7 is a diagram illustrating a sequence example when switching the radio communication scheme from LTE to WCDMA in the terminal 100. Meanwhile, FIG. 8 is a diagram illustrating a sequence example when switching the radio communication scheme from WCDMA to LTE in the terminal 100. The processing in the terminal 100 illustrated in FIGS. 7 and 8 is performed by the PS 1121 and the like in the CPP 112 in the terminal 100, for example.

First, the example illustrated in FIG. 7 is described. For example, the terminal 100 determines to switch the radio communication scheme from LTE to WCDMA based on an index such as reception quality. After the determination to switch, the terminal 100 transmits a switch request to the destination base station (s-eNB) 200-1 (S11).

For example, the terminal 100 may transmit a response message ("UE Capability Information") to "UE Capability Enquiry" (S10), the response message including the switch request.

Upon receipt of the switch request from the terminal 100, the base station (s-eNB) 200-1 transmits a message ("HANDOVER REQUIRED") including the switch request to a CN 300 (S12).

Upon receipt of the message including the switch request, the CN 300 newly generates a message ("RELOCATION REQUEST") including the switch request and transmits the generated message to a base station controller (t-RNC) 400-1 (S13).

The base station controller (t-RNC) 400-1 monitors one or more base stations 200, for example, and performs control and the like for handover of the terminal 100. For example, the base station controller (t-RNC) 400-1 also manages inter-RAT handover.

Upon receipt of the message including the switch request, the base station controller (t-RNC) 400-1 generates a message ("RELOCATION REQUEST ACK") regarding permission for the switch request, and transmits the generated message to the CN 300 (S14).

Upon receipt of the message from the base station controller (t-RNC) 400-1, the CN 300 generates a message ("HANDOVER COMMAND") including information to permit the switch request, and transmits the generated message to the base station 200-1 (S15).

Upon receipt of the message, the base station 200-1 generates a message ("Mobility From EUTRAN Command") regarding the switch permission, and transmits the generated message to the terminal 100.

Figure 9:
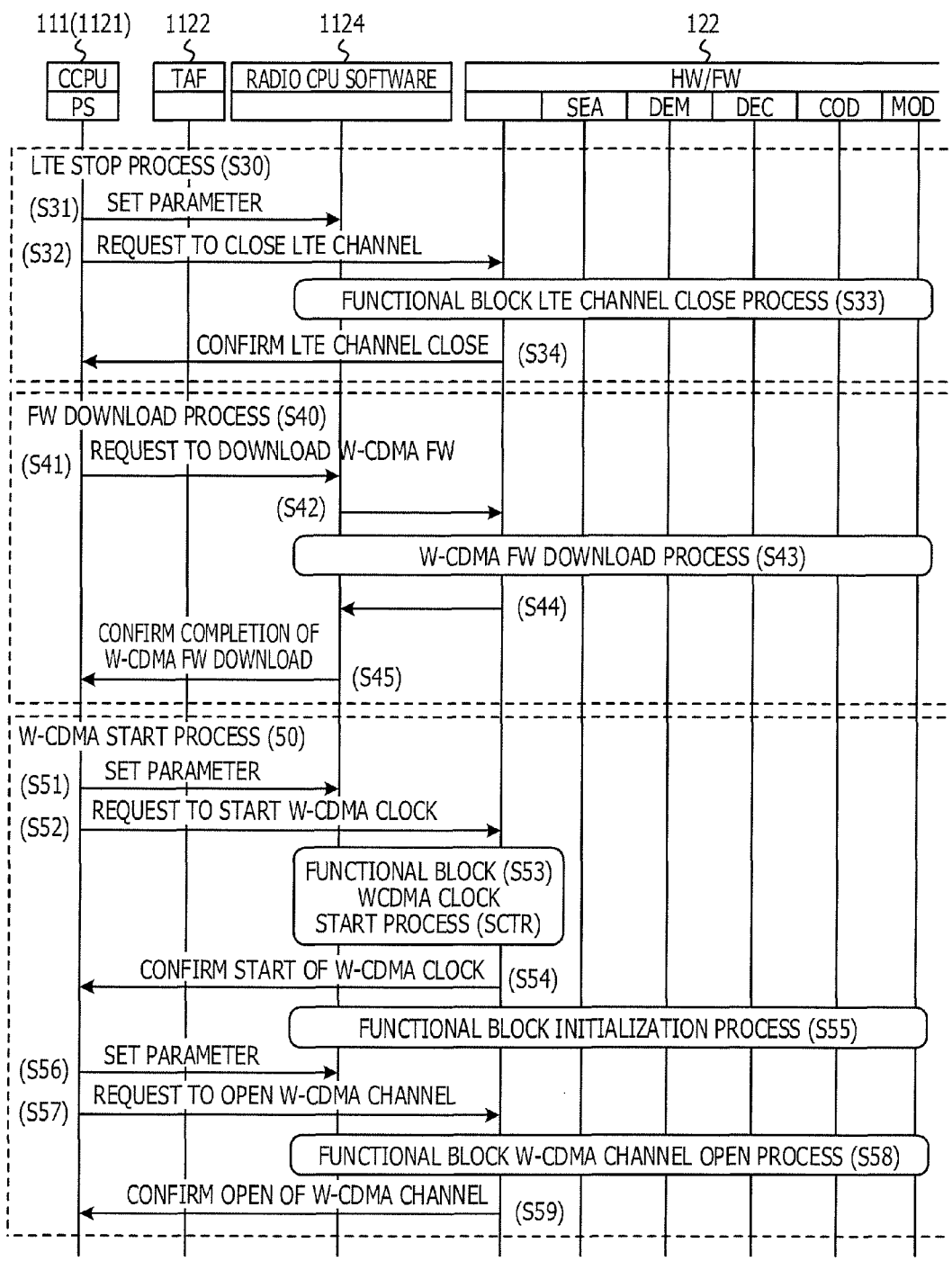
FIG. 9 is a sequence diagram illustrating an operation example in the terminal device.
Figure 10:
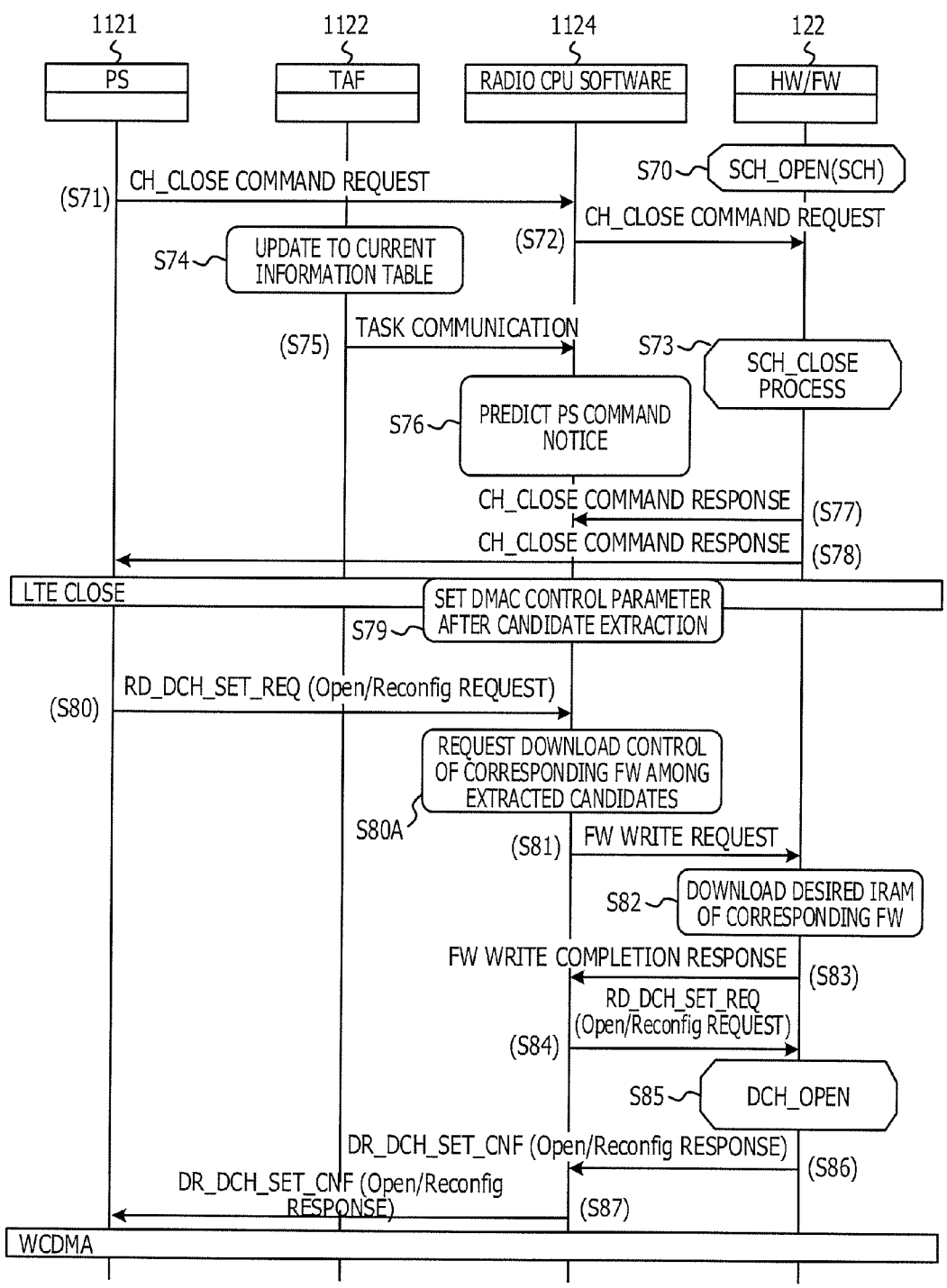
FIG. 10 is a sequence diagram illustrating an operation example in the terminal device.

Upon receipt of the message regarding the switch permission, the terminal 100 starts radio communication scheme switch processing (or RAT switch processing) illustrated in FIG. 9 or FIG. 10.

FIG. 8 illustrates a sequence example when switching the radio communication scheme from WCDMA to LTE.

The terminal 100 completes connection to a higher-level device by transmitting a connection request message ("ATTACH/RAU REQUEST") to the CN 300, for example (S20).

Thereafter, the terminal 100 determines to change the radio communication scheme from WCDMA to LTE, based on an index such as a received signal level. Then, the terminal 100 generates a message ("UE CAPABILITY INFORMATION") including a switch request, and transmits the generated message to the base station controller (s-RNC) 400-2 through the base station and the like (S21).

Upon receipt of the message from the terminal 100, the base station controller (s-RNC) 400-2 generates a message ("RELOCATION REQUIRED") including the switch request, and transmits the generated message to the CN 300 (S22).

Next, upon receipt of the message from the base station controller (s-RNC) 400-2, the CN 300 generates a handover request message ("HANDOVER REQUEST") including the switch request, and transmits the generated message to a handover destination base station (t-eNB) 200-2 (S23).

Upon receipt of the handover request message from the CN 300, the base station (t-eNB) 200-2 generates a permission message ("HANDOVER REQUEST ACK") including information to permit the switch request, and transmits the generated message to the CN 300 (S24).

The permission information for the switch request is transmitted to the terminal 100 while being included in each of the messages (e.g., "RELOCATION COMMAND" and "HANDOVER FROM UTRAN COMMAND") from the CN 300 through the base station controller (s-RNC) 400-2 (S25 and S26).

When the terminal 100 receives the permission information for the switch request (e.g., "RELOCATION COMMAND" message or "HANDOVER FROM UTRAN COMMAND" message) from the base station (s-eNB) 200-1 or the base station controller (s-RNC) 400-2, the PS 1121 in the terminal 100 notifies the TAF 1122 of information about RAT switch and allows the respective function units to perform the radio communication scheme switch processing illustrated in FIG. 9 or FIG. 10.

For example, when the permission information for the switch request from the base station (s-eNB) 200-1 is "MobilityFromEUTRANCommand" message (S16 in FIG. 7), the PS 1121 notifies the TAF 1122 of information about RAT switch from LTE to WCDMA.

Alternatively, when the permission information for the switch request from the base station controller (s-RNC) 400-2 is "HANDOVER FROM UTRAN COMMAND" (S26 in FIG. 8), the PS 1121 notifies the TAF 1122 of information about RAT switch from WCDMA to LTE.

<RAT Switch Processing>

Next, description is given of radio communication scheme switch processing performed by the terminal 100. FIGS. 9 and 10 are diagrams illustrating a sequence example of the radio communication scheme switch processing. FIGS. 9 and 10 both illustrate an operation example when switching the radio communication scheme from LTE to WCDMA (e.g., HSPA). Note that FIG. 10 illustrates details about a part of an LTE stop process (S30) and a FW download process (S40) in the sequence example illustrated in FIG. 9.

As illustrated in FIG. 9, the radio communication scheme switch processing is performed in the order of LTE stop process (S30), firmware (FW) download (or loading, hereinafter may be referred to as "download") process (S40) and WCDMA start process (S50).

Upon detection of the receipt of the permission information from the base station 200, the PS 1121 notifies the TAF 1122 of the information about RAT switch, and starts the LTE stop process (S30). In the LTE stop process (S30), the PS 1121 sets parameters for the radio CPU software 1124 (S31) and outputs an LTE channel close request to the radio CPU software 1124 (S32).

Note that, as the LTE radio control firmware 122, for example, there are five kinds of radio control firmware as illustrated in FIG. 9, i.e., channel search radio control firmware ("SEA"), demodulation radio control firmware ("DEM"), error-correcting decoding radio control firmware ("DEC"), error-correcting coding radio control firmware ("COD") and modulation radio control firmware ("MOD"). As for the WCDMA radio control firmware, there are also five kinds of radio control firmware as described above.

Upon receipt of the LTE channel close request from the PS 1121, the radio control firmware 122 performs a channel close process for a target LTE channel (S33).

As the channel close request, for example, there are channel close requests for a shared channel (SCH) and an individual channel (DCH). The PS 1121 outputs a channel close request for a predetermined channel. Upon receipt of the channel close request, the radio control firmware 122 performs a close process for the radio control firmware corresponding to the requested channel, e.g., the demodulation radio control firmware ("DEM") or the like.

After the completion of the channel close process for LTE, the radio control firmware 122 transmits an LTE channel close end confirmation notice to the PS 1121 (S34).

Thus, the terminal 100 becomes a channel closed state ("No Ch (S00)" in FIG. 6), for example, and makes a transition to a radio communication scheme switchable state.

Next, the terminal 100 performs the download process (S40) for the WCDMA radio control firmware.

The PS 1121 outputs a download request for the WCDMA radio control firmware to the radio CPU software 1124 (S41), and the radio CPU software 1124 outputs the download request to the radio control firmware 122 (S42).

Then, downloading of the WCDMA radio control firmware is performed between the radio CPU software 1124 and the radio control firmware 122 (or the IRAM 121) (S43).

For example, when the radio CPU software 1124 gives a download instruction to the DMAC 114, the radio control firmware 122 read by the DMAC 114 is outputted to the IRAM 121 through the radio CPU software 1124. This process is described in detail with reference to FIG. 10.

After the completion of the downloading of the WCDMA radio control firmware 122, the radio control firmware 122 sends a download completion notice to the radio CPU software 1124 (S44), and the radio CPU software 1124 sends the notice to the PS 1121 (S45).

Next, the terminal 100 performs the WCDMA start process (S50). Specifically, the PS 1121 sets parameters (S51) and requests the radio control firmware 122 for a WCDMA clock start request (S52). For example, since an LTE internal clock is different from a WCDMA internal clock, the clock start request enables the WCDMA HW 124 to operate using the WCDMA clock.

Then, the radio CPU software 1124 and the radio control firmware 122 perform a WCDMA clock start process (S53). For example, the radio control firmware 122 controls the TCXO 145 to generate a clock synchronized with the WCDMA internal clock, and the WCDMA HW 124 operates using the WCDMA clock.

After the WCDMA clock start process, the radio control firmware 122 notifies the PS 1121 of a confirmation notice (S54).

Next, the radio CPU software 1124 and the radio control firmware 122 perform a functional block initialization process (S55). For example, each radio control firmware 122 such as the search firmware ("SEA") is initialized.

Then, the PS 1121 sets parameters for the radio CPU software 1124 (S56) and outputs a WCDMA channel open request to the radio control firmware 122 (S57).

Upon receipt of the channel open request, the radio control firmware 122 performs a channel open process for each radio control firmware (e.g., the search firmware ("SEA") or the like) (S58).

For example, the channel open request is an open request (or an open request command) for the individual channel (DCH) or the shared channel (SCH). The radio control firmware 122 performs an open process for the radio control firmware (e.g., the search firmware ("SEA") or the like) corresponding to a target channel.

After starting the channel open process, the radio control firmware 122 outputs a confirmation notice to the PS 1121 (S59).

Through a series of operations described above, the terminal 100 can perform radio communication by switching the radio communication scheme from LTE to WCDMA.

FIG. 10 is a diagram illustrating a sequence example of the radio communication scheme switch processing. As to processes overlapping with those illustrated in FIG. 9, description thereof may be omitted. FIG. 10 also illustrates the example of switching the radio communication scheme from LTE to WCDMA.

Note that, in the example illustrated in FIG. 10, the radio control firmware 122 opens the shared channel (SCH) and performs processing of user data (S70).

Upon detection of the receipt of permission information from the base station 200, the PS 1121 notifies the TAF 1122 of information about RAT switch, and starts the LTE stop process (S30). For example, the PS 1121 generates a channel close (CH_CLOSE) request command, and outputs the command to the radio CPU software 1124 (S71).

The radio CPU software 1124 outputs the received channel close request command to the radio control firmware 122 (S72). Thus, the radio control firmware 122 performs a close process for the opened channel (the shared channel (SCH) in the example illustrated in FIG. 10), for example (S73).

The TAF 1122 uses the RAT switch information notified from the PS 1121 to update the current information table 1110 (S74). Note that the TAF 1122 may update the current information table 1110 when receiving a request instruction (e.g., an instruction to request packet communication for browsing Web services and an instruction to request calling of telephone services) from the user core ACPU unit 135 or when receiving a result of demodulation or decoding of a downlink signal from the PS 1121.

Here, the current information table 1110 is described in detail.

FIG. 11A is a diagram illustrating an example of items stored in the current information table 1110 and FIG. 11B is a diagram illustrating a configuration example of the current information table 1110. The current information table 1110 is stored in the memory 117, for example.

The items stored in the current information table 1110 include, for example, within zone/out of zone information, RRC mode, type of PLMN (Public Land Mobile Network), kind of services provided, connected domain, current location registration state, and RAT transition destination. Among the above, the within zone/out of zone information is information that the TAF 1122 can receive from the ACPU 135, for example. The other items are information that can be received from the RRC layer 1121-*a*, for example.

The within zone/out of zone information ((1) in FIG. 11) indicates whether the terminal 100 is located within or out of the zone of the base station 200, for example. The ACPU 135 on the user core side performs the determination and outputs the determination result to the TAF 1122.

The RRC mode ((2) in FIG. 11) represents an idle mode in which the terminal is not radio connected to the base station 200, a connected mode in which the terminal is radio connected thereto or a recovery mode in which the terminal is reconnected, for example.

The PLMN ((3) in FIG. 11) represents the type of a public mobile communication network to which the terminal 100 is connected, for example, including a network (e.g., Home PLMN) with which a subscriber is registered and a network (e.g., Visited PLMN) with which the subscriber is not registered.

The kind of services provided ((4) in FIG. 11) represents one of or both of CS (Circuit Switching) about circuit switching and PS (Packet Switching) about packet switching, for example.

The connected domain ((5) in FIG. 11) represents one of or both of CS and PS, besides NULL, for example.

The current location registration state ((6) in FIG. 11) represents a location registration state of the terminal 100, for example, including a location unregistered state, a location registered state, a preparatory state before start of location registration after the terminal 100 is turned on, and the like.

The RAT transition destination ((7) in FIG. 11) represents a RAT transition destination to be notified by the PS 1121 according to information obtained by demodulating or decoding a control signal from the base station 200. For example, the RAT transition destination is "0" when the current RAT is WCDMA, "1" when RAT switch is desired from WCDMA to LTE, "2" when the current RAT is LTE, and "3" when RAT switch is desired from LTE to WCDMA.

As to the within zone/out of zone information ((1) in FIG. 11), for example, the ACPU 135 on the user core side performs the determination and outputs the determination result to the TAF 1122. On the other hand, the items from the RRC mode ((2) in FIG. 11) to the current location registration state ((6) in FIG. 11) are acquired by transmitting and receiving messages regarding radio communication with the base station 200 in the RRC layer 1121-a, for example. The items or information stored in the current information table 1110 represent the current radio communication state of the terminal 100, for example. The information acquired by the ACPU 135, the RRC layer 1121-a and the like is notified to the TAF 1122.

FIG. 11B illustrates the configuration example of the current information table 1110. The example illustrated in FIG. 11B indicates that the terminal 100 is "out of zone" and is in "idle mode" in "Home PLMN", the service provided is "PS", the connected domain is "CS", the location registration state is "during location registration processing", and the RAT transition destination is "2", i.e., the current RAT is LTE.

Referring back to FIG. 10, the TAF 1122 then notifies the radio CPU software 1124 of the updated information of the current information table 1110 (S75). For example, the updated information about the items such as the within zone/out of zone information and the RRM mode is notified.

Next, the radio CPU software 1124 prefetches (or specifies) a command to be notified from the PS 1121, based on the current information table 1110 (S76).

Here, description is given of an algorithm of how the radio CPU software 1124 prefetches a command.

First, a command to be prefetched is a command to be notified first to the radio CPU software 1124 from the PS 1121 after switching of the radio communication scheme, for example. In the example illustrated in FIG. 10, the command to be prefetched is an open request command ("RD_DCH_SET_REQ", S80) of the individual channel in WCDMA.

Such a command to be prefetched can be specified based on the information in the current information table 1110.

For example, when the terminal 100 is "within zone", the RRC mode is "connected", the provided service is "PS", the WCDMA command is "RD_DCH_SET_REQ" and the RAT transition destination is "1" (from WCDMA (current state) to LTE), the open request command of the individual channel to be inputted after RAT switching can be specified as "LB_SCH_OPEN_REQ" for LTE.

Alternatively, when the terminal 100 is "within zone", the RRC mode is "connected", the provided service is "PS" and the RAT transition destination is "3" (from LTE (current state) to WCDMA), the open request command of the individual channel to be inputted after RAT switching can be specified as "RD_DCH_SET_REQ" for WCDMA.

In other words, the radio CPU software 1124 specifies a command (or a command to be prefetched) to be inputted first from an upper layer after switching of the radio communication scheme, based on the communication state of the terminal 100, for example.

Such specification of the command to be prefetched can be performed by extraction from the current information table 1110 and the channel state transition command information tables, for example. The channel state transition command information tables are described below.

FIG. 12 illustrates an example of the LTE channel state transition command information table 111, and FIG. 13 illustrates an example of the WCDMA channel state transition command information table 1112. Each of the two channel state transition command information tables 1111 and 1112 represents a command to be prefetched, which is specified based on the communication state of the terminal 100. Moreover, each of the two channel state transition command information tables 1111 and 1112 represents which radio control firmware is to be downloaded for the specified command to be prefetched.

The LTE channel state transition command information table 1111 includes an item "prefetching notification information". The information of the current information table 1110 is stored in "prefetching notification information". Likewise, the WCDMA channel state transition command information table 1112 also includes an item "prefetching notification information". The information of the current information table 1110 is also stored in "prefetching notification information".

For example, although "prefetching notification information" in the LTE channel state transition command information table 1111 includes items storing "(1) within zone, (2) idle mode, (3) Home PLMN and (7) LTE (current state)" as illustrated in FIG. 12, the information stored in "prefetching notification information" corresponds to the information in the current information table 1110.

Moreover, each of the two channel state transition command information tables 1111 and 1112 includes an item "command issuance". The commands to be prefetched are stored in "command issuance".

As illustrated in FIG. 12, for example, commands such as "LB_PBCH_OPEN_REQ" are stored in "command issuance" in the LTE channel state transition command information table 1111.

The radio CPU software 1124 specifies the command to be prefetched as described below, for example.

Specifically, the radio CPU software 1124 selects the LTE channel state transition command information table 1111 illustrated in FIG. 12 when the transition destination (or the switched radio communication scheme) is "LTE" as to the "RAT transition destination" in the current information table 1110 (e.g., "RAT transition destination" is "1" or "2"). On the other hand, the radio CPU software 1124 selects the WCDMA channel state transition command information table 1112 illustrated in FIG. 13 when the transition destination is "WCDMA" as to the "RAT transition destination" in the current information table 1110 (e.g., "RAT transition destination" is "0" or "3").

Then, the radio CPU software 1124 specifies an item in "prefetching notification information" having information corresponding to the information stored in the current information table 1110, and specifies a command to be prefetched by extracting a command stored in "command issuance" corresponding to the specified "prefetching notification information".

For example, when the current information table 1110 indicates that the terminal 100 is "within zone" in "idle mode" and is connected to the base station 200 in "Home PLMN" and "RAT transition destination" is "LTE (current state)", the radio CPU software 1124 specifies a command to be prefetched as described below.

Specifically, the radio CPU software 1124 selects the LTE channel state transition command information table 1111 illustrated in FIG. 12 since "RAT transition destination" is "LTE". Then, the radio CPU software 1124 specifies a "prefetching notification item" storing information indicating that the terminal 100 is "within zone" in "idle mode" and is connected to the base station 200 in "Home PLMN" in the LTE channel state transition command information table 1111. In the example illustrated in FIG. 12, the top "prefetching notification item" is specified. Thereafter, the radio CPU software 1124 extracts "LB_PBCH_OPEN_REQ" stored in "command issuance" corresponding to the specified "prefetching notification item". The radio CPU software 1124 specifies the extracted "LB_PBCH_OPEN_REQ" as the command to be prefetched.

As to the channel state transition command information tables 1111 and 1112, the tables 1111 and 1112 indicate which radio control firmware is to be downloaded for each open request, as described above. In the LTE channel state transition command information table 1111, for example, "radio control execution firmware", "DEMO FW", "DECORDER FW", "CORDER FW" and "MOD FW" are to be downloaded for the "LB_SCH_OPEN_REQ" (DL/UL-SCH open request) command.

Note that FIGS. 12 and 13 illustrate the examples of the channel state transition command information tables 1111 and 1112 in the two radio communication schemes, i.e., LTE and WCDMA. However, there may be a channel state transition command information table corresponding to another radio communication scheme such as GSM, for example.

The current information table 1110 and the channel state transition command information tables 1111 and 1112 are stored in the memory 117, for example. When specifying a command to be prefetched, for example, the radio CPU software 1124 accesses the current state table 1110 and channel state transition command information tables 1111 and 1112 stored in the memory 117 to specify a command in the item "command issuance", thereby specifying the command to be prefetched.

Referring back to FIG. 10, after completing the close process for the shared channel (SCH) (S73), the radio control firmware 122 transmits a close response command to the close request command (S71 and S72) to the radio CPU software 1124 and the PS 1121 (S77 and S78).

Thus, the close process for the opened predetermined channel of LTE is completed in the terminal 100, for example.

Next, the radio CPU software 1124 sets control parameters for the DMAC 114 (S79).

Examples of the control parameters include, for example, an address of the SDRAM 130 as a transfer source, an address of the IRAM 121 as a transfer destination, a transfer direction, the number of bytes to be transferred, and the like. Such control parameters correspond to radio control firmware to be downloaded, for example. When the radio control firmware to be downloaded varies, the address of the radio control firmware stored in the SDRAM 130, the address of the transfer destination IRAM 121 and the number of bytes to be transferred also vary. The control parameters represent parameters regarding how the radio control firmware is downloaded, for example.

Note that, when the radio CPU software 1124 downloads the radio control firmware in a variable size using a memory overlay method, a beginning address of the transfer destination IRAM 121 is fixed and writing of the radio control firmware is started from the beginning of the fixed address, for example.

For example, the radio CPU software 1124 outputs the set control parameters to the DMAC 114. The DMAC 114 performs downloading of the radio control firmware, and the like according to the set control parameters.

Next, the radio CPU software 1124 receives a command outputted from the PS 1121 (S80).

In this event, the radio CPU software 1124 determines whether or not the prefetched command (S76) is the same as the received command (S80), for example. For example, the radio CPU software 1124 determines whether or not the information indicating the command type included in the received command coincides with the prefetched command.

When the prefetched command is the same as the received command, the radio CPU software 1124 takes the processing to the next step. On the other hand, when the commands are not the same, the radio CPU software 1124 receives a command and then sets control parameters for the DMAC 114, which correspond to the received command. The reason why the control parameters are set again as described above is because, when the prefetched command is different from the received command, for example, the radio control firmware to be downloaded differs and the address, the number of bytes to be transferred and the like also differ.

Next, the radio CPU software 1124 requests the DMAC 114 to control the radio control firmware 122 (S80A).

For example, the radio CPU software 1124 selects radio control firmware corresponding to the prefetched command, based on the channel state transition command information tables 1111 and 1112. In the example illustrated in FIG. 10, the radio CPU software 1124 extracts radio control software ("SEARCH FW", "DECORDER", "CORDER FW" and "MOD FW") corresponding to the prefetched open command ("RD_DCH_SET_REQ") from the WCDMA channel state transition command information table 1112, and makes a request to download the radio control firmware.

Then, the DMAC 114 downloads the requested radio control firmware (S80) based on the set control parameters (S79), for example. For example, the radio control firmware read from the SDRAM 130 is outputted to the radio CPU software 1124, and the radio CPU software 1124 outputs the radio control firmware to the IRAM 121 (S81).

Next, the IRAM 121 stores the downloaded radio control firmware (S82). Then, after completing the writing of the downloaded radio control firmware into the IRAM 121, the IRAM 121 or the radio control firmware 122 notifies the radio CPU software 1124 of a completion response (S83). Thus, downloading of the radio control firmware related to the changed radio communication scheme, for example, is completed.

Next, the radio CPU software 1124 outputs the prefetched command to the radio control firmware 122 (S84). In the example illustrated in FIG. 10, the radio CPU software 1124 outputs the open request command ("RD_DCH_SET_REQ") of the individual channel (DCH).

Then, the radio control firmware 122 performs a channel open process according to the command received from the radio CPU software 1124 (S85). In the example illustrated in FIG. 10, a channel open process is performed for the WCDMA individual channel (DCH).

After completing the channel open process, the radio control firmware 122 outputs a response command to the open request command (S84) to the radio CPU software 1124 (S86).

Upon receipt of the response command from the radio control firmware 122, the radio CPU software 1124 notifies the PS 1121 of the response command (S87).

Thus, the channel open process for WCDMA, for example, is completed, and the terminal 100 uses the downloaded radio control firmware 122 to perform processing such as demodulation and error-correcting decoding for the opened channel (the individual channel (DCH) in the example illustrated in FIG. 10).

As described above, in the second embodiment, the terminal 100 does not perform processing such as i) transition to a sleep state, ii) power-up of the IRAM 121 and iii) reboot of the IRAM 121, for example, when downloading the radio control firmware.

In the IRAM 121, for example, when rewriting the whole radio control firmware 122 stored in the IRAM 121, the radio control firmware 122 can be newly stored in a predetermined address in the IRAM 121 by performing the above processing i) to iii).

Meanwhile, the terminal according to the second embodiment downloads a part of the radio control firmware, rather than the whole radio control firmware, as illustrated in FIGS. 12 and 13, for example. Thus, the whole radio control firmware is not rewritten in the IRAM 121. In this case, the radio control firmware 122 is overwritten and stored in a predetermined area of the IRAM 121, for example. Therefore, downloading into the IRAM 121 can be performed without performing processing of powering up the IRAM 121 again (the above processing i) to iii)) and the like.

Accordingly, since the terminal 100 according to the second embodiment does not perform the above processing i) to iii), for example, the processing time for switching the radio communication scheme can be reduced.

Moreover, when downloading the radio control firmware in the second embodiment, no additional new memory is provided, for example, to store the radio control firmware. Thus, an increase in memory capacity can be suppressed.

Furthermore, in the second embodiment, for example, the radio CPU software 1124 prefetches a command to be outputted from the PS 1121 (S76). Thus, for example, the radio CPU software 1124 can set the control parameters for the DMAC 114 (S79) without waiting for reception of a command transmitted from the PS 1121 (S80). Therefore, the radio CPU software 1124 can reduce the processing time by downloading the radio firmware upon receipt of the command (Close) response in S78. Thus, the processing time for switching the radio communication scheme can be reduced.

Furthermore, in the second embodiment, the radio control firmware to be downloaded, for example, is not the whole radio control firmware related to the switched radio communication scheme, but a part of the radio control firmware (S80). Thus, compared with the case of downloading the whole radio control firmware, for example, the terminal 100 can reduce the processing time for the downloading itself. As a result, the processing time for switching the radio communication scheme can be reduced.

Other Embodiments

Next, other embodiments are described.

In the second embodiment, the description is given of the case where the radio CPU software 1124 sets the control parameters (e.g., S79 in FIG. 10) after receiving the channel close response (S77). For example, the radio CPU software 1124 may set the control parameters (S79) without waiting for the channel close response after prefetching a command (S76).

In the second embodiment, the description is given of the case where the radio CPU software 1124 sets the control parameters in the item "prefetching notification information" in the channel state transition command information tables 1111 and 1112, for example (e.g., S79 in FIG. 10). In this case, the radio CPU software 1124 may perform the subsequent operation (e.g., S80) after updating "prefetching notification information" in the tables 1111 and 1112. Specifically, after "prefetching notification information" is updated, for example, the radio CPU software 1124 can start processing for download. Therefore, the updating of "prefetching notification information" generates "download control". The generation of "download control" allows the radio CPU software 1124 to start downloading, for example.

Moreover, in the second embodiment, the description is given of the case where the memory 117 storing the current information table 1110 and the channel state transition command information tables 1111 and 1112 is outside the CCPU 111, for example. For example, the memory 117 may be inside the CCPU 111.

Furthermore, in the second embodiment, the description is given of the switching of the radio communication scheme from LTE to WCDMA. Also for switching from WCDMA to LTE, for example, the radio communication scheme switch processing illustrated in FIG. 10 can be executed in the terminal 100. In this case, for example, the radio CPU software 1124 selects an open request command for LTE, as a command to be prefetched, from "command issuance" in FIG. 12. An open request notified from the PS 1121 becomes an open request for LTE. Furthermore, for switching from a first radio communication scheme to a second radio communication scheme, processing can be performed in the terminal 100 according to the sequence illustrated in FIG. 10. For example, the radio CPU software 1124 prefetches an open request command for the second radio communication scheme after switching (S76) and then the open request command for the second radio communication scheme is notified from the PS 1121.

Figure 14:
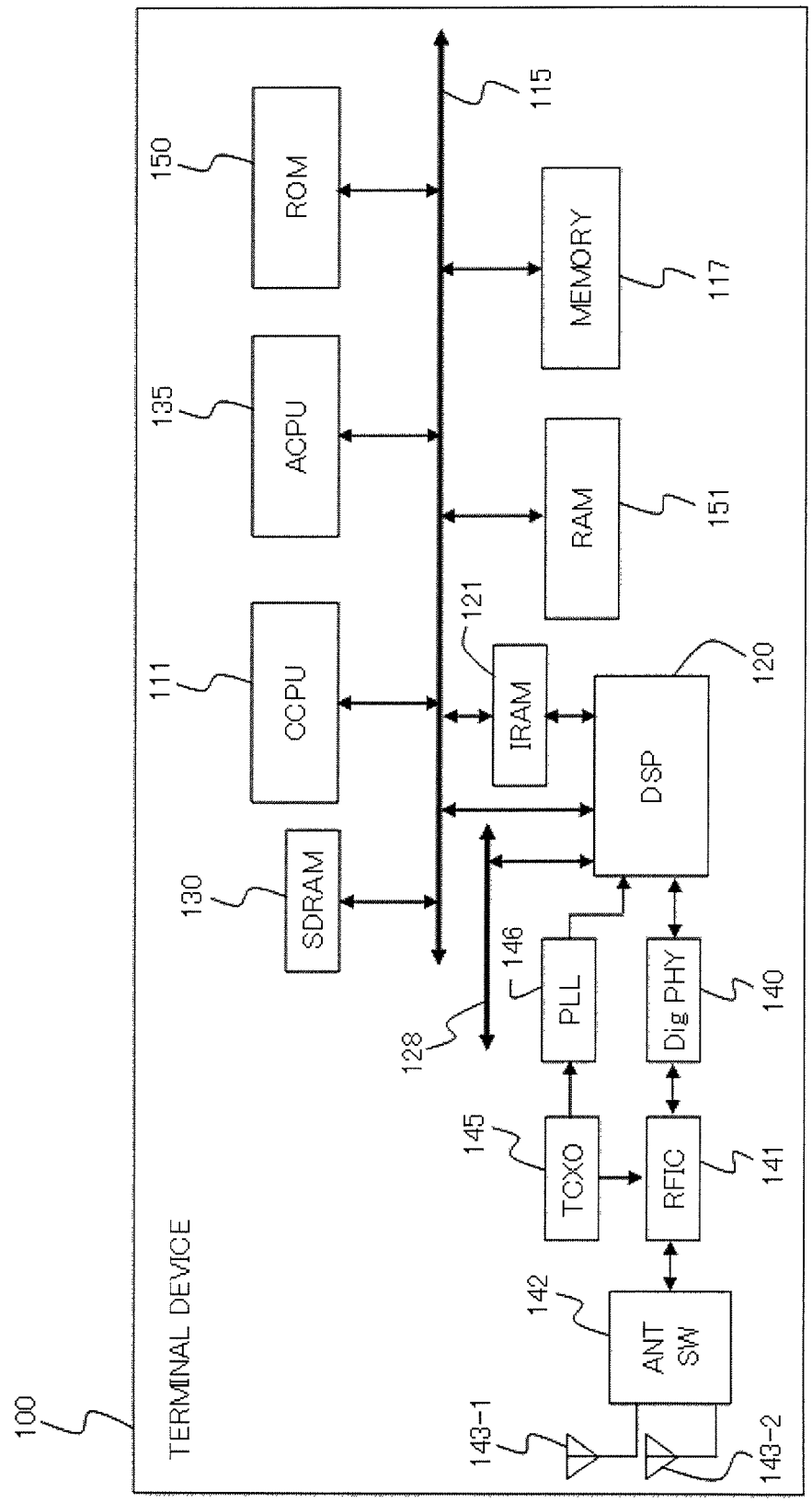
FIG. 14 is a diagram illustrating a configuration example of a terminal device.

FIG. 14 is a diagram illustrating a hardware configuration example of the terminal 100. The terminal 100 further includes a ROM (Read Only Memory) 150 and a RAM (Random Access Memory) 151.

The CCPU 111 reads a CPP 112 stored in the ROM 150, for example, loads the CPP into the RAM 151 and executes the loaded CPP 112, thereby realizing functions related to the CPP 112 or executing processing related to the CPP 112.

Moreover, the CCPU 111 reads a program stored in the ROM 150, for example, loads the program into the RAM 151 and executes the loaded program, thereby realizing functions or executing processing related to the PS 1121, TAF 1122, radio CPU software 1124 and Other Block (including DMAC) 114.

Furthermore, the CCPU 111 reads a UPP 113 stored in the ROM 150, for example, loads the UPP 113 into the RAM 151 and executes the loaded UPP 113, thereby realizing functions or executing processing related to the UPP 113.

Likewise, the ACPU 135 reads a program stored in the ROM 150, for example, loads the program into the RAM 151 and executes the loaded program, thereby realizing functions or executing processing in the Application PF 136.

As described in the second embodiment, the DSP 120 corresponds to the L1-BaseBand unit 120, for example.

Therefore, various kinds of processing such as the download processing described in the second embodiment can also be performed in the terminal 100 illustrated in FIG. 14.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
a first memory configured to store a first program for providing a first radio access technology, and a second program for providing a second radio access technology;
a second memory configured to store the second program for execution;
a first processor configured to input a command to a second processor when a radio access technology used by the radio communication device is changed from the second radio access technology to the first radio access technology,
wherein the first processor is configured to:
predict the command among a plurality of commands defined in the first radio access technology, based on a communication state of the radio communication device,
select a first part which is one part of the first program based on the predicted command, the first part being used in a start process of the first radio access technology to be executed in response to the predicted command, and
control to load the selected first part from the first memory into the second memory, and
wherein the second memory is configured to store the first part loaded from the first memory, the second processor is configured to execute the start process by using the first part stored in the second memory, a completion of storing the first program other than the first part is later than a completion of storing the first part, and wherein the second processor is further configured to provide a processing for layer 1 of a protocol stack, and the first processor is further configured to provide processing across a layer 1 and a layer 2 of the protocol stack.

2. The radio communication device according to claim 1, wherein the first processor is further configured to control to set a parameter for loading the at least one preferential program module, before the command is inputted to the second processor.

3. The radio communication device according to claim 1, further comprising:
a third memory configured to store information defining correspondences, each of the correspondences associating each command with at least one program module,
wherein the first processor is configured to select the at least one preferential program module based on the stored information.

4. The radio communication device according to claim 1, wherein the first processor is further configured to reselect the at least one preferential program module based on the inputted command when the predicted command and the inputted command are different.

5. The radio communication device according to claim 1, wherein the first processor is further configured to provide a function of direct memory access controller (DMAC).

6. The radio communication device according to claim 1, further comprising:
a fourth memory configured to store the communication state,
wherein the first processor is further configured to provide a terminal adaptation function (TAF), which obtains the communication state and stores the communication state in the fourth memory.

7. The radio communication device according to claim 1, wherein the communication state includes information on the first wireless access technology and information on the second wireless access technology.

8. The radio communication device according to claim 7, wherein the communication state further includes information indicating whether the radio communication device is out of a range of communication, information on a radio resource control (RRC) mode, and information on a public land mobile network (PLMN).

9. The radio communication device according to claim 8, wherein the communication state further includes information on a provided service, information on an attached domain, and information on a state of a location registration.

10. The radio communication device according to claim 1, wherein:
the first processor is further configured to provide processing for a radio resource control (RRC) layer of a protocol stack,
the second processor is further configured to provide baseband unit, and
the first processor is further configured to input the command that is generated in the RRC layer to the baseband unit.

11. The radio communication device according to claim 1, wherein the command is an open request for opening a channel of the second radio access technology.

12. The radio communication device according to claim 1, wherein the radio communication device comprises a mobile terminal.

13. The radio communication device according to claim 1, wherein the first radio access technology comprises one of radio access technologies, the second radio access technology comprises another of the radio access technologies, and the radio access technologies comprise long term evolution (LTE), LTE-advanced (LTE-A), wideband code division multiple access (WCDMA), high speed packet access (HSPA), and global system for mobile communication (GSM).

14. The radio communication device according to claim 1, wherein the command to be predicted is a command to be output from the first processor to the second processor.

15. A radio communication method comprising:
   storing, in a first memory, a first program providing a first radio access technology and a second program for providing a second radio access technology;
   storing, in a second memory, the second program for executing;
   executing, by a second processor, a second program that is stored in the second memory;
   inputting a command from a first processor to the second processor when a radio access technology used by the radio communication device is changed from the second radio access technology to the first radio access technology;
   predicting the command among a plurality of commands defined in the first radio access technology, based on a communication state of the radio communication device;
   selecting a first part which is one part of the first program based on the predicted command, the first part being used in a start process of the first radio access technology to be executed in response to the predicted command;
   controlling to load the selected first part from the first memory into the second memory;
   storing, in the second memory, the first part loaded from the first memory; and
   executing, by the second processor, the start process by using the first part stored in the second memory, a completion of storing the first program other than the first part is later than a completion of storing the first part,
   wherein the second processor is configured to provide a processing for layer 1 of a protocol stack, and the first processor is configured to provide processing across a layer 1 and a layer 2 of the protocol stack.

* * * * *